US009223501B2

(12) United States Patent  (10) Patent No.: US 9,223,501 B2
Terayama et al.  (45) Date of Patent: Dec. 29, 2015

(54) COMPUTER SYSTEM AND VIRTUAL SERVER MIGRATION CONTROL METHOD FOR COMPUTER SYSTEM

(75) Inventors: Atsumi Terayama, Kawasaki (JP); Akihisa Nagami, Yokohama (JP); Toru Tanaka, Sagamihara (JP); Yasunori Kaneda, Yokohama (JP); Yoshinori Okami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 671 days.

(21) Appl. No.: 13/511,102

(22) PCT Filed: Apr. 23, 2012

(86) PCT No.: PCT/JP2012/002785
§ 371 (c)(1),
(2), (4) Date: May 21, 2012

(87) PCT Pub. No.: WO2013/160933
PCT Pub. Date: Oct. 31, 2013

(65) Prior Publication Data
US 2013/0282887 A1  Oct. 24, 2013

(51) Int. Cl.
*G06F 3/06* (2006.01)
*G06F 17/30* (2006.01)
*G06F 12/08* (2006.01)
*G06F 9/455* (2006.01)

(52) U.S. Cl.
CPC ............... *G06F 3/061* (2013.01); *G06F 3/067* (2013.01); *G06F 3/0647* (2013.01); *G06F 3/0662* (2013.01); *G06F 9/45533* (2013.01); *G06F 3/065* (2013.01); *G06F 3/0619* (2013.01)

(58) Field of Classification Search
None
See application file for complete search history.

(56) References Cited

U.S. PATENT DOCUMENTS

| 7,484,208 | B1* | 1/2009 | Nelson ............................... 718/1 |
| 8,271,814 | B2* | 9/2012 | Padmanabhan et al. ....... 713/310 |
| 2008/0263258 | A1* | 10/2008 | Allwell et al. .................... 711/6 |
| 2009/0049241 | A1 | 2/2009 | Ohno et al. |
| 2009/0144389 | A1* | 6/2009 | Sakuta .......................... 709/215 |
| 2009/0150463 | A1* | 6/2009 | Sekiguchi et al. ............. 707/204 |
| 2009/0150608 | A1* | 6/2009 | Innan et al. .................... 711/113 |
| 2010/0082922 | A1* | 4/2010 | George et al. ................. 711/162 |
| 2010/0169537 | A1* | 7/2010 | Nelson ............................ 711/6 |
| 2010/0299368 | A1* | 11/2010 | Hutchins et al. ............... 707/803 |
| 2011/0023114 | A1* | 1/2011 | Diab et al. ........................ 726/22 |
| 2011/0099403 | A1* | 4/2011 | Miyata ...................... G06F 1/32 713/323 |

(Continued)

FOREIGN PATENT DOCUMENTS

JP  4704659  6/2011
WO  WO 2010/095174 A1  8/2010

OTHER PUBLICATIONS

PCT International Search Report and Written Opinion on application PCT/JP2012/002785 mailed Oct. 9, 2012; 15 pages.

*Primary Examiner* — Ario Etienne
*Assistant Examiner* — Ho Shiu
(74) *Attorney, Agent, or Firm* — Foley & Lardner LLP

(57) ABSTRACT

When migrating a virtual server between a plurality of physical servers, a pre-migration connection relationship between the virtual server and a storage area used by the virtual server is maintained after the migration of the virtual server by using a cooperative mechanism between a plurality of storage apparatuses even if the storage area used by the virtual server is migrated between the plurality of storage apparatuses. A computer system and virtual server migration control method for the computer system is described.

18 Claims, 27 Drawing Sheets

(56) References Cited

U.S. PATENT DOCUMENTS

| | | | |
|---|---|---|---|
| 2011/0206047 A1* | 8/2011 | Donthamsetty et al. | 370/392 |
| 2011/0246669 A1* | 10/2011 | Kanada et al. | 709/238 |
| 2011/0265084 A1* | 10/2011 | Knowles et al. | 718/1 |
| 2011/0270945 A1 | 11/2011 | Shiga et al. | |
| 2011/0289205 A1* | 11/2011 | Hansson et al. | 709/224 |
| 2012/0011254 A1* | 1/2012 | Jamjoom et al. | 709/226 |
| 2012/0079226 A1* | 3/2012 | Kihara et al. | 711/165 |
| 2012/0226866 A1* | 9/2012 | Bozek et al. | 711/122 |
| 2012/0278442 A1* | 11/2012 | Saika | 709/219 |
| 2013/0031544 A1* | 1/2013 | Sridharan et al. | 718/1 |
| 2013/0238786 A1* | 9/2013 | Khesin | 709/224 |

\* cited by examiner

FIG.2

Volume Definition Table 163

| Device ID 163a | Volume Type 163b | Source Device 163c | Host Assignment 163d | Status 163e |
|---|---|---|---|---|
| 01:A0 | Thin-Provisioned | StoragePool#001 | Yes | Normal |
| 01:A1 | Symplex | N/A | Yes | Normal |
| 01:A2 | Backup | 01:A0 | No | Split |
| 01:A3 | Backup | 01:A1 | No | Synchronized |
| 01:A4 | Symplex | N/A | Yes | Normal |
| 01:E0 | Tiered | StoragePool#002 | Yes | Freeze |
| 01:E1 | Snapshot Parent | N/A | No | Normal |
| 01:E2 | Snapshot Child | 01:E1 | Yes | Copying |
| 01:E3 | Online Volume Migration | 01:A4 | No | Cashe-off |
| 20:01 | External | SPort#2, LUN1 | Yes | ... |
| ... | ... | ... | ... | ... |

FIG. 3

Allocation Management Table

| Volume Segment Number | RAID Group Number | Physical Drive Number | LBA |
|---|---|---|---|
| 000 | 0 | HDD#101-01<br>HDD#101-02<br>HDD#101-03<br>HDD#101-04 | 0 ~ 4095 |
| 001 | | | 4096 ~ 8191 |
| 002 | | | 8192 ~ 12287 |
| ⋮ | ⋮ | ⋮ | ⋮ |
| Terminal Segment | xxxxx | xxx-xx | xxxx ~ xxxx |

Storage Domain Definition Table

| Storage Domain Name (165a) | Storage Port Name (165b) | Host Port Name List (165c) | LUN (165d) | Device Number (165e) | Path ID (165f) |
|---|---|---|---|---|---|
| Domain#037 | 12:00:09:0C:00:01 | {00:22:12:A1:09:CD, 00:22:12:A1:09:CE} | 1 | 01:A0 | Path#2104 |
| | | | 2 | 01:A1 | Path#2105 |
| | | | 3 | 01:A4 | Path#2106 |
| Domain#081 | 12:00:09:0C:00:02 | {11:0E:75:64:09:01} | 4 | 01:E0 | Path#2107 |
| ... | ... | ... | ... | ... | ... |

FIG.5

Port Management Table    167

| Storage Port Name | Alias | Port Attributes | Participant List |
|---|---|---|---|
| 12:00:09:0C:00:01 | SPort#1 | Target | {00:22:12:A1:09:CD, 00:22:12:A1:09:CE} |
| 12:00:09:0C:00:02 | SPort#2 | External | {11:0E:75:64:09:01} |
| 12:00:09:0C:00:03 | SPort#3 | N/A | {11:0E:75:64:09:02} |
| ⋮ | ⋮ | ⋮ | ⋮ |

Virtual Disk Management Table

| 552a | 552b | 552c | 552d | 552e | 552f | 552g | 552h | 552i | 552j |
|---|---|---|---|---|---|---|---|---|---|
| Physical Server ID | Virtual Server ID | Shared Volume Group | Virtual Disk ID | Virtual Disk Type | Path to Virtual Disk on File System | Located Logical Volume | Disk Drive Location | Device Number | Port Name |
| Host#01 | VM18825-00293 | N/A | 32339-a000c-32435 | Fixed | C:¥VirtualDisks¥vdisk01.vdk | Vol0000-2043-12B2 | Target 0, Bus 1, LUN 4 | EF:20:01:E0 | 00:22:12:A1:09:01 |
| Host#01 | VM3e007-39567 | Gr#1 | 12e32-2ff9c-3242d | Thin-Provisioned | D:¥VirtualDisks¥vdisk01.vdk | Vol0000-E022-451A | Target 1, Bus 1, LUN 3 | EF:20:01:A4 | 00:22:12:A1:09:CD |
| Host#01 | VM898c-4421b | N/A | 34810-a9dde-98203 | Differential | C:¥VirtualDisks¥vdisk02-diff1020.vdk | Vol0000-2043-12B2 | Target 0, Bus 1, LUN 4 | EF:20:01:E0 | 00:22:12:A1:09:01 |
| ... | ... | ... | ... | ... | ... | ... | ... | ... | ... |

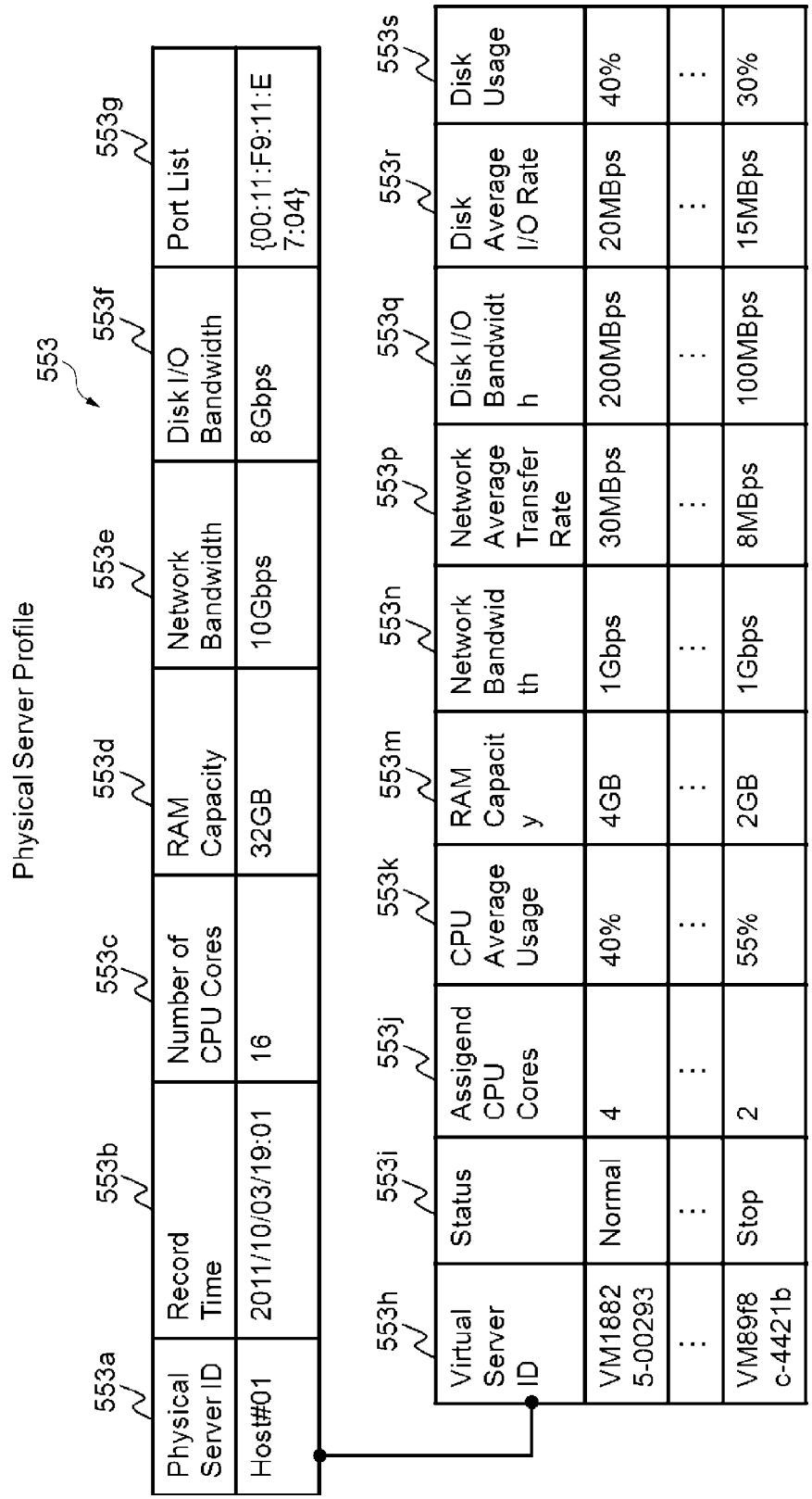

FIG.8

Volume Management Table 557

| Volume Name 557a | Storage Serial Number 557b | Device ID 557c | Volume Type 557d | Source Name 557e | Host Assignment 557f | Status 557g |
|---|---|---|---|---|---|---|
| 10220 | 201 | 01:A0 | Thin-Provisioned | StoragePool#001 | Yes | Normal |
| 10221 | 201 | 01:A1 | Symplex | N/A | Yes | Normal |
| 10222 | 201 | 01:A2 | Backup | 10220 | No | Split |
| 10223 | 201 | 01:A3 | Backup | 10221 | No | Synchronized |
| 32400 | 201 | 01:A4 | Symplex | N/A | Yes | Normal |
| 15099 | 201 | 01:E0 | Tiered | StoragePool#002 | Yes | Normal |
| 15100 | 201 | 01:E1 | Snapshot Parent | N/A | No | Freeze |
| 15101 | 201 | 01:E2 | Snapshot Child | 15100 | Yes | Normal |
| 15102 | 201 | 01:E3 | Online Volume Migration | 32400 | No | Copying |
| 34419 | 201 | 20:01 | External | SPort#2, LUN1 | Yes | Cashe-off |
| ... | ... | ... | ... | ... | ... | ... |

FIG. 9

Storage Domain Management Table 558

| Storage Domain Name | Storage S/N | Storage Port Name | Host Port Name List | LUN | Device Number | Volume Name | Path ID |
|---|---|---|---|---|---|---|---|
| 558a | 558b | 558c | 558d | 558e | 558f | 558g | 558h |
| Domain#037 | 201 | 12:00:09:0C:00:01 | 00:22:12:A1:09:CD, 00:22:12:A1:09:CE | 1 | 01:A0 | 10220 | Path#2104 |
| | | | | 2 | 01:A1 | 10221 | Path#2105 |
| | | | | 3 | 01:A4 | 32400 | Path#2106 |
| Domain#081 | 201 | 12:00:09:0C:00:02 | 11:0E:75:64:09:01 | 4 | 01:E0 | 15099 | Path#2107 |
| ... | | | ... | | | | ... |

FIG.10

Volume Mapping Table 559

| Source Storage S/N 559a | Source Volume Name 559b | Source Port Name 559c | Mapping Type 559d | Status 559e | Destination Storage S/N 559f | Destination Volume Name 559g | Destination Port Name 559h |
|---|---|---|---|---|---|---|---|
| 201 | 10220 | 12:00:09:0C:00:0A | External Connection | Online | 101 | 00401 | 30:11:F9:11:E7:01 |
| 201 | 15101 | 12:00:09:0C:00:0B | Replication | Copying | 101 | 00402 | 30:11:F9:11:E7:02 |
| ... | ... | ... | ... | ... | ... | ... | ... |

FIG.11

Zone Management Table 555

| Zone Name | Switch ID | Type of Zone | Port Name List |
|---|---|---|---|
| Zone#041 | FCSW#01 | Hardware | {SW_Port1, SW_Port2, SW_Port10} |
| Zone#040 | FCSW#01 | Hardware | {SW_Port3, SW_Port4, SW_Port12} |
| Zone#102 | FCSW#02 | Software | {PS1_Port0, PS3_Port0, STG1_Port1A} |

Target Mapping Table 549

| Physical Server ID 549a | Shared Volume Group 549b | Virtual Server ID 549c | Virtual Disk ID 549d | Path to Virtual Disk on File System 549e | Disk Drive Location 549f | Host Port 549g | Zone Name 549h | Storage Port 549i | Storage Domain 549j | Volume Name 549k |
|---|---|---|---|---|---|---|---|---|---|---|
| Host#01 | N/A | VM188 25-00293 | 32339-a000c-32435 | C:¥VirtualDisks¥vdisk0 1.vdk | Target 0, Bus 1, LUN 4 | 00:22: 12:A1: 09:01 | Zone# 041 | 12:00:0 9:0C:00 :02 | Domain #081 | 10220 |
| Host#01 | Gr#1 | VM3e0 07-39567 | 12e32-2ff9c-3242d | D:¥VirtualDisks¥vdisk0 1.vdk | Target 1, Bus 1, LUN 3 | 00:22: 12:A1: 09:CD | Zone# 102 | 12:00:0 9:0C:00 :01 | Domain #037 | 32400 |
| Host#01 | N/A | VM89f8 c-4421b | 34810-a9dde-98203 | C:¥VirtualDisks¥vdisk0 2-diff1020.vdk | Target 0, Bus 1, LUN 4 | 00:22: 12:A1: 09:01 | Zone# 041 | 12:00:0 9:0C:00 :02 | Domain #081 | 10220 |
| ... | ... | ... | ... | ... | ... | ... | ... | ... | ... | ... |

FIG. 13

Volume Attachment Design Table 550

| Target Volume Name 550a | Mapped Volume Name 550b | Destination Physical Server ID 550c | Destination Storage S/N 550d | Disk Drive Location 550e | Host Port Name 550f |
|---|---|---|---|---|---|
| 10220 | 00401 | Host#4 | 101 | Target 0, Bus 1, LUN 4 | 00:5B:12:A1:09:02 |
| 15101 | 00402 | Host#7 | 101 | Target 0, Bus 1, LUN 2 | 00:5B:12:A1:09:03 |
| 15101 | 00402 | Host#8 | 101 | Target 0, Bus 1, LUN 2 | 00:5B:12:A1:09:04 |
| ... | ... | ... | ... | ... | ... |

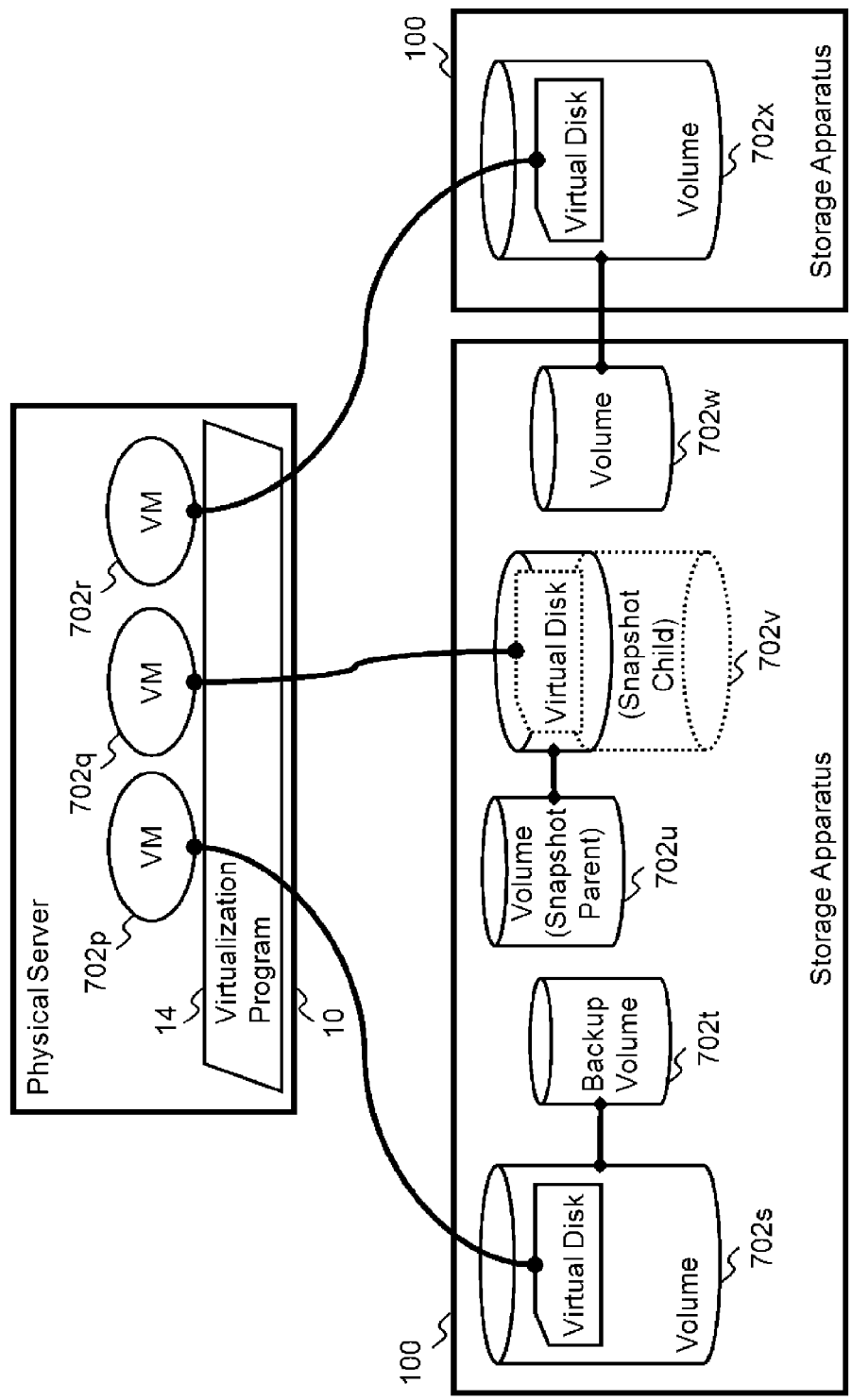

COMPUTER SYSTEM AND VIRTUAL SERVER MIGRATION CONTROL METHOD FOR COMPUTER SYSTEM

TECHNICAL FIELD

The present invention relates to a computer system and a virtual server migration control method for the computer system. Specifically speaking, the invention relates to: a computer system characterized in that a virtual server is migrated between a plurality of physical servers and a storage area used by the virtual server is also migrated between a plurality of storage apparatuses; and a virtual server migration method for the computer system.

BACKGROUND ART

Recently, server virtualization technology has become widespread and it is common to integrate a plurality of virtual servers on single hardware (physical server). Furthermore, its purpose is not only to reduce capital investment, but an information system can be flexibly operated, for example, by developing a technique to complete the introduction of a server to users by means of template management of a virtual server, which has been set, simply by creating a copy of a virtual disk used by the virtual server, or a technique to cancel hot spots by detecting the hot spots such as the occurrence of a failure or load unbalance and dynamically changing a logical configuration of the virtual server.

However, server virtualization is to introduce a new abstraction layer into a physical server; and accordingly, this might complicate configuration management of the physical server. For example, as compared to a case where a conventional server virtualization technique is not used, it has become difficult to understand which server uses which volume, based only on configuration information of the physical server and a storage apparatus.

As a result, it becomes inevitably necessary to have virtual server management software manage a connection relationship between storage areas and virtual servers that changes from moment to moment, and virtual server resource usage in these virtual servers. Also, an attempt has been made to extend functions of the virtual server management software in order to manage storage resources which are one of important components of the virtual servers. In order to do so, there is a method of making the virtual server management software have a function operating virtual storage areas and storage apparatuses.

For example, a function cooperating with storage, which is provided by a certain server virtualization software vender, is to equip the virtual server management software or server virtualization software with operation to send/receive commands, which can be interpreted by storage apparatuses made by a cooperative vender, based on cooperation with the storage vender. As a result, the storage apparatus can detect volumes used by the virtual servers and, therefore, can assume processing, such as copying of storage areas, that has been conventionally performed by the server virtualization software.

Furthermore, certain virtual server management software is equipped with a mechanism for managing storage apparatuses by using a storage management protocol SMI-S (Storage Management Initiative-Specification) which is an industry standard. As a result, a physical server that supports the SMI-S can specify volumes used by a virtual server in the physical server and utilize a copy function and thin provisioning function of storage apparatuses in cooperation with changes of the configuration of the virtual server.

The functions provided by the virtual server management software make it possible to migrate a virtual server to a different physical server and migrate a virtual storage area (virtual disk) of the virtual server to a different storage apparatus. This migration method is designed to avoid critical adverse effects on business activities performed by the virtual server by transferring data, which is used by the virtual server, from a transfer source to a transfer destination via a network between physical servers or a network between storage apparatuses (PTL 1).

Incidentally, it is known to treat a plurality of disk arrays of different models as if they were one disk array, by connecting another disk array (external storage) via a Fibre Channel interface and mapping its logical volumes (PTL 2).

CITATION LIST

Patent Literature

PTL 1: U.S. Pat. No. 7,484,208
PTL 2: Japanese Patent No. 4704659

SUMMARY OF INVENTION

Technical Problem

The migration of the virtual storage area, a computer system uses the same network via the physical server in order to transfer necessary data for the business activities and transfer necessary data for the migration. So, performance degradation is inevitable.

Furthermore, the computer system has to consume arithmetic resources of the physical server for the purpose of migration, so that degradation of arithmetic performance required for normal business activities is inevitable. As dependency on information systems has increased in recent years, an amount of data retained by the information systems has increased steadily; and the problem of virtual server migration is a workload and duration for migration of virtual storage areas. Accordingly, efficient operation and management of storage areas used by virtual servers is required in order to flexibly operate the virtual servers.

Even if the computer system attempts to migrate a large amount of virtual servers to a new environment, the virtual disks can be migrated efficiently across storage apparatuses by utilizing functions of the storage apparatuses. As a result, as compared to a conventional migration function which is mainly based on virtualization software on the physical server, adverse effects on the performance in business activities of the information system can be minimized and faster processing for migrating the virtual servers and the virtual disks can be executed.

Generally, targets to which the functions of the storage apparatuses are applied by storage management software for managing the storage apparatuses are logical units called volumes; and there is a possibility that a plurality of virtual disks, which are formed into files, may be stored in one volume. The volume(s) is a basic unit used when allocating storage resources to a physical server.

The storage management software can recognize which volume is allocated to which physical server (virtual server), but cannot instantly perceive in which volume a target virtual disk (file) to be migrated between storage apparatuses along with migration of the virtual server is stored.

Even if the storage management software can determine which virtual disk is stored in the volume by examining a file system, it is impossible to further find out the status of use, for example, whether the volume is actually connected to the virtual server and the virtual disk is used or not. Thus, the storage management software is not conscious of virtual disks as information retained by the volumes. When the computer system executes migration processing, a pre-migration connection relationship between the virtual server and its virtual disk cannot be maintained after the migration only by using the functions of storage apparatuses.

Furthermore, the identifier of a source volume, from which a virtual disk is migrated along with migration of a virtual server by means of the functions of storage apparatus, may be sometimes different from the identifier of a migration destination volume. When the migration is performed across storage apparatuses of different venders or models, rules for assigning identifiers may possibly be different. So, there is a possibility that the physical server can no longer recognize the migration destination volume as the same volume as the migration source volume.

The identifier used by virtualization software of the physical server may possibly be different from the identifier assigned by the storage management software for setting the functions of storage apparatuses, to the volume for the purpose of management. This happens when the functions of storage apparatuses require a special management system, for example, when the above situation is prominent particularly, for example, in a case where the functions of storage apparatuses are unique functions of the vender.

Therefore, when the computer system migrates a virtual disk by using the functions of storage apparatuses, a system administrator has to check the content of the migrated volume one by one after migration, identify a virtual disk of the migration target virtual server among a large amount of virtual servers, and then reconnect the virtual disk to the migration destination virtual server. Accordingly, the administrator has a heavy burden as the workload increases and the risk of making a mistake in reconnection work due to reliance on manual work.

Furthermore, virtualization programs often have a virtual server migration function that migrates a virtual server to a different physical server. This migration is sometimes performed by the system administrator or is sometimes automatically performed by, for example, a load distribution function. As a result, the location of the virtual server on the physical server may be changed at arbitrary timing. So, when the virtual server is to be actually migrated, the virtual server or the virtual disk might have already been migrated to another physical server or storage apparatus. Therefore, there is a possible method of cancelling load distribution settings in order to prevent the virtual server migration function from working; however, this method would result in the problem of damaging flexibility of the system, which is normally provided by the server virtualization technique, and forcing the administrator to bear an excessive burden. Therefore, it is difficult for the computer system to cancel the virtual server migration function, so that it is further impossible to maintain the pre-migration connection relationship between a virtual server and its virtual disk after the migration of the virtual server.

So, it is an object of the present invention to provide, when migrating a virtual server between a plurality of physical servers, a computer system capable of maintaining the pre-migration connection relationship between the virtual server and its storage area after the migration of the virtual server by utilizing a cooperative mechanism between a plurality of storage apparatuses even if the storage area used by the virtual server is migrated between the plurality of storage apparatuses; and also provide a control method for migrating a virtual server between a plurality of physical servers.

Solution to Problem

In order to achieve the above-described object, the computer system and its virtual server migration control method according to the present invention are characterized in that configuration information of a virtual server and a virtual disk is obtained from a hardware and software environment which is a migration source of the virtual server, the configuration information is used to make a migration setting by means of the functions of storage apparatuses which are targeted at volumes, and the connection relationship between the virtual server and the virtual disk is further reconstructed at a migration destination by using the configuration information.

Advantageous Effects of Invention

When migrating a virtual server between a plurality of physical servers, it is possible to provide, according to the present invention: a computer system capable of maintaining the pre-migration connection relationship between a virtual server and a storage area after the migration of the virtual server by utilizing a cooperative mechanism between a plurality of storage apparatuses even if the storage area used by the virtual server is migrated between the plurality of storage apparatuses; and a control method for migrating the virtual server between the plurality of physical servers.

BRIEF DESCRIPTION OF DRAWINGS

FIG. 2 shows a volume definition table.

FIG. 3 shows an allocation management table.

FIG. 4 shows a storage domain definition table.

FIG. 5 shows a port management table.

FIG. 6 shows a virtual disk management table.

FIG. 7 shows physical server information according to an embodiment of the present invention.

FIG. 8 shows volume management table.

FIG. 9 shows a storage domain management table.

FIG. 10 shows a volume mapping table.

FIG. 11 shows a zone management table.

FIG. 12 shows a migration target mapping table.

FIG. 13 shows a volume attachment design table.

FIG. 15b is a second block diagram showing the connection relationship between virtual servers and virtual disks.

DESCRIPTION OF EMBODIMENTS (Embodiment 1)

This embodiment provides a method for migrating a virtual server and its virtual disk to a different physical server and storage apparatus.

1. Physical Configuration and Logical Configuration

Figure 1A:
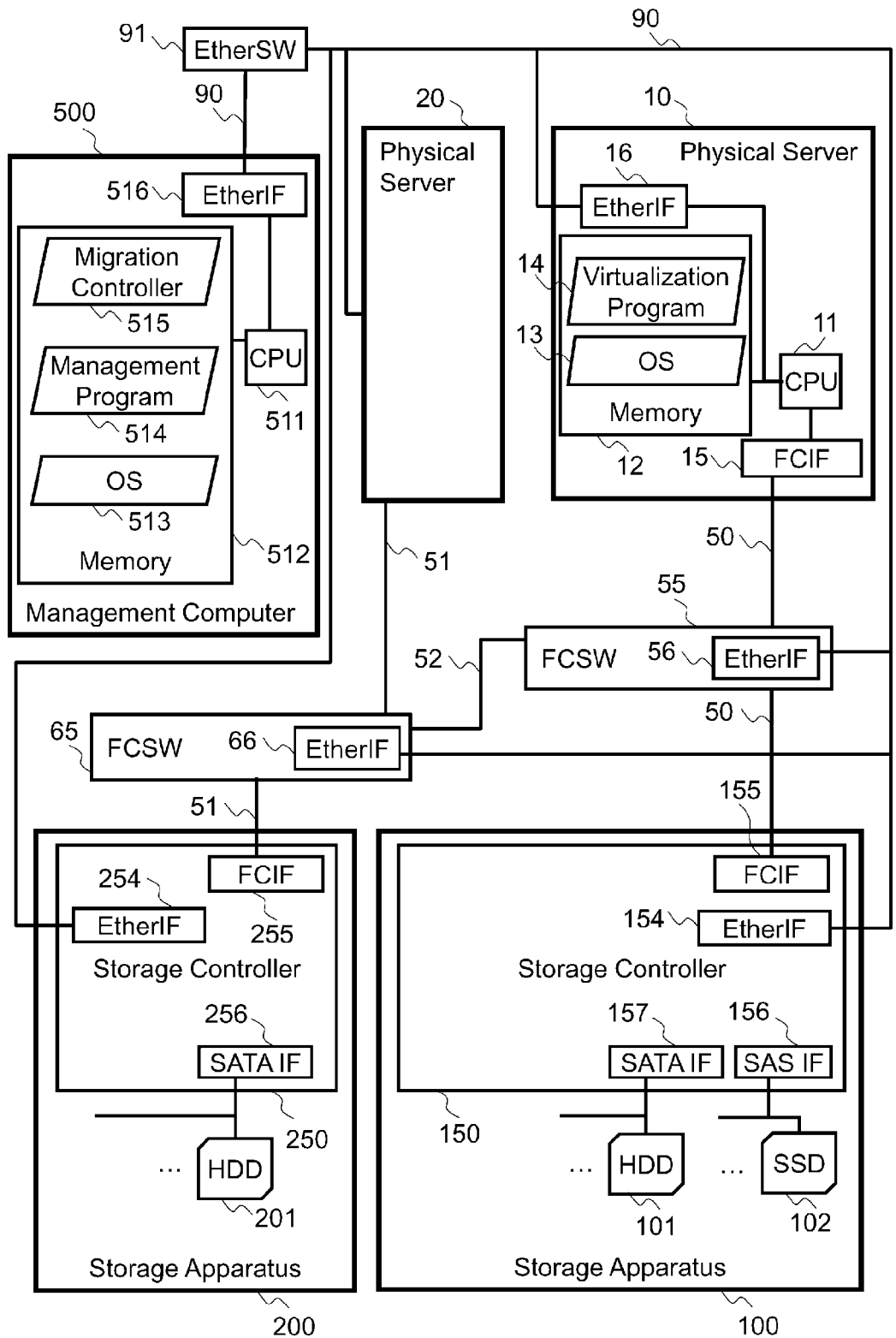
FIG. 1a is a block configuration diagram of a computer system according to an embodiment of the present invention.

FIG. 1(a) shows the configuration of a computer system according to this embodiment. This computer system includes one or more first physical servers 10, one or more second physical servers 20, one or more first storage apparatuses 100, one or more second storage apparatuses 200, and one or more management computers 500.

The first physical server 10 stores a virtualization program 14 and an operating system 13 in a memory 12; and a CPU 11 executes processing required by these programs. The first physical server 10 includes an Ethernet interface 16 and a Fibre Channel interface 15.

The first physical server 10 connects to another physical server or a client computer via the Internet interface (Ethernet interface) 16, or more precisely by using one or more network ports of the Ethernet interface 16, and sends/receives data, which is used by the programs internally operating, to/from the other physical server or the like.

There may be one Ethernet interface 16; or a plurality of Ethernet interfaces 16 may be provided depending on intended purposes, for example, for management and for services, if the Ethernet interfaces 16 have a function connecting to another computer. Furthermore, this interface is not limited to an interface in conformity with Ethernet standards and may be an interface in conformity with other standards as long as it can realize a function connecting to another computer.

The first physical server 10 mutually connects with a storage apparatus or network equipment (for example, a Fibre Channel switch 55) via the Fibre Channel interface 15, or more precisely by using one or more network ports of the Fibre Channel interface 15, and sends/receives data, which is used by programs internally operating, to/from the storage apparatus or the like.

There may be one Fibre Channel interface 15; or a plurality of Fibre Channel interfaces 15 may be provided depending on intended purposes as long as they can be mutually connected to storage apparatuses or network equipment that lies between the storage apparatuses. Furthermore, this interface is not limited to an interface in conformity with Fibre Channel standards and may be an interface in conformity with other standards such as Ethernet, InfiniBand, or FCoE (Fibre Channel over Ethernet) as long as it has a function connecting to the storage apparatus.

The first physical server 10 makes an operating system (OS) 13, which is a basic program for realizing information processing by controlling hardware and using programs located at an upper level, operate.

Furthermore, a virtualization program 14 operates on the same physical server 10 and realizes a function logically dividing one piece of hardware into one or more virtual areas. A virtual server (Virtual Machine [VM]) operates in a virtual hardware area divided by the virtualization program 14 and application programs operate on the virtual server. An appropriate OS may be made to operate inside the virtual server in order to make the application programs operate. Functions of the OS 13 are similar to those of the virtualization program 14 in terms of abstraction of hardware and the virtualization program 14 may be mounted as part of the OS 13 in the physical server.

The second physical server 20 has the same hardware configuration as that of the first physical server as it has basic components (the virtualization program 14 and the OS 13) for executing processing for migrating a virtual server and a virtual disk in cooperation with the first physical server 10. However, for other purposes, the second physical server may have a configuration different from that of the first physical server 10. The first storage apparatus 100 provides a storage area configured for each logical unit called a volume to equipment on the SAN (for example, the first physical server 10). The first storage apparatus 100 has a storage controller 150 for intensively controlling each component such as a storage device like an HDD 101.

Figure 1B:
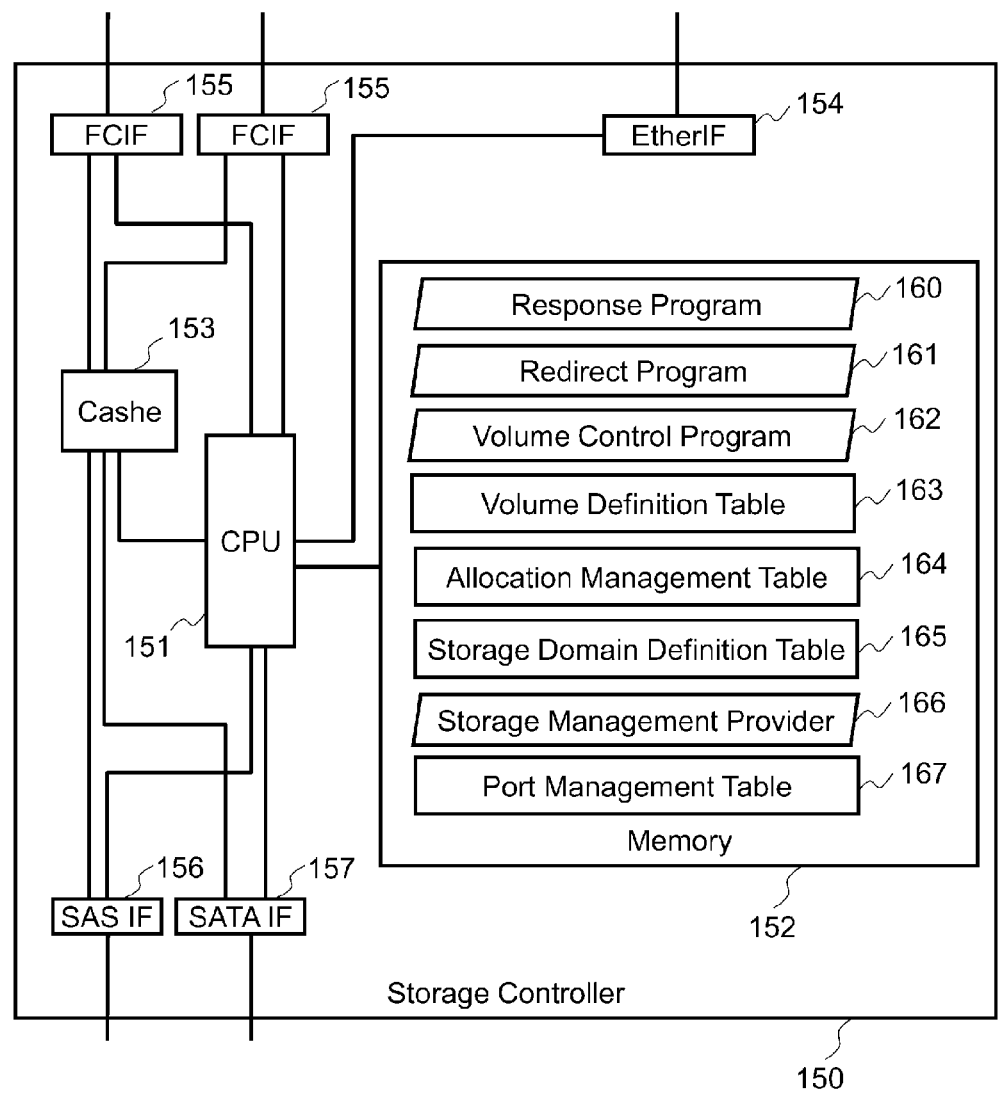
FIG. 1b is a block configuration diagram of a storage apparatus.

As shown in FIG. 1(b), the storage controller 150 sends/receives programs on the first physical server 10 and/or data required by processing by applications via the Fibre Channel interface 155 or more precisely by using a network port on the Fibre Channel interface 155.

In this embodiment, the storage controller 150 provides storage areas to physical servers in accordance with SCSI (Small Computer System Interface) standards. The storage controller 150 includes a SATA (Serial Advanced Technology Attachment) interface 157 or SAS (Serial Attached SCSI) interface 156 for connecting to, for examples, HDDs 101 or SSDs 102, which are physical storage devices, and an Internet interface 154 for connecting to the management computer 500. These network interfaces for connecting to the physical storage devices and another computer are not limited to those in accordance with the standards described in this embodiment and may be those in conformity with other standards as long as each of them has a function capable of achieving the same purpose.

A memory 152 for the storage controller 150 stores a response program 160, a redirect program 161, a volume control program 162, a volume definition table 163, an allocation management table 164, a storage domain definition table 165, a storage management provider 166, and a port management table 167; and a CPU 151 executes necessary operations for processing of these programs. A cache 153 temporarily stores data when the data is read from, or written to, the physical storage devices (the HDDs 101 or the SSDs 102).

The response program 160 responds to at least READ CAPACITY/READ/WRITE commands from the physical servers and other storage apparatuses.

The redirect program 161 provides a storage virtualization function called external connection in this embodiment and implements processing for redirecting access to the first storage apparatus 100 to another storage apparatus.

The volume control program 162 implements volume generation/deletion/configuration change processing for providing storage areas of the physical storage devices, which are provided in the first storage apparatus 100, as volumes to the physical servers. The configuration of each volume is managed as a record in the volume definition table 163 by the volume control program 162.

The volume definition table 163 shown in FIG. 2 has each of the following fields: a device identifier 163a for uniquely identifying a volume in the relevant device or system; a volume type 163b showing an attribute; a source device 163c showing a related source volume if the relevant volume is associated with another volume; a host assignment flag 163d showing whether the relevant volume is connected to a physical server or not; and a status 163e showing the current status of the volume.

The volume control program 162 can set validation/invalidation of the cache 153 with respect to each volume and may retain this as the status 163e in the volume definition table 163 or another field for retaining the setting of the cache may be provided separately. The volume type 163b managed by the volume definition table 163 will be explained later together with functions provided by the first storage apparatus 100.

As described earlier, each area of the physical storage devices is managed as a volume. The allocation management table 164 shown in FIG. 3 serves to associate an address in the volume (segment number) with an LBA (Logical Block Addressing) of the physical storage device and is created or changed by the volume control program 162. Access from the physical server to the volume is executed by designating the volume segment number 164a and the response program 160 refers to each field of the allocation management table 164, designates an LBA area in an actual physical disk drive, and accesses it, thereby making it possible to read or write data. Each field of the table shown in FIG. 3 shows an example of a case where volumes are configured by using a RAID (Redundant Arrays of Independent Disks) technique.

Access by the physical server to a volume is controlled by an access range defined by the storage domain definition table 165 (see FIG. 4) which is edited by the volume control program 162. The storage apparatus provides storage resources to a plurality of physical servers and it is necessary to control access by associating the physical servers with the volumes in order to guarantee consistency of data retained in the volumes as a result of reading and writing asynchronously issued by various physical servers. This is realized by a basic technique, which is generally called LUN masking, for storage management by using the Fibre Channel.

In this embodiment, the storage domain definition table 165 defines a range in which the physical server can access the storage apparatus, by designating a network port name 165c of one or more physical servers to a network port name 165b on the storage apparatus side; and this range will be hereinafter referred to as the storage domain. The storage domain is assigned a unique domain name 165a in the storage apparatus.

At the same time, a unique LUN (Logical Unit Number) 165d is set to each volume and the physical server included in the host (physical server) port name field 165c identifies the relevant volume as a disk drive based on this LUN 165d. When a volume is associated with a storage domain in this way, the LUN 154d is always set. On the other hand, a storage domain which is not associated with any volume may exist. A logical access path that associates a volume with (a network port of) a physical server via the LUN is called a path; and the path has a unique path identifier 165f in the storage apparatus.

The storage management provider 166 (see FIG. 1(b)) provides an interface for having the storage apparatus 100 managed by the management computer 500. Specifically speaking, the storage management provider 166 provides commands or API (Application Program Interface) to remotely make the storage manager of the management computer 500 execute the procedure for, for example, operating the volume control program 162 in the storage apparatus 100 and referring to the volume definition table 163 and the storage domain definition table 165.

The management provider 166 is incorporated from the beginning by a vender who supplies the storage apparatus. A means for communicating with the storage management provider 166 is limited to a means capable of realizing a storage management function and uses a language such as HTML or XML or a management protocol such as SMI-S. The storage management interface is also mounted on the physical server 10 and the Fibre Channel switch 55 and enables management software of the management computer to refer to and set the configuration.

The management provider 166 may be mounted in the storage controller in a form, for example, as application software or an agent operating on the OS or as a function of part of another program used to control the storage apparatus. Furthermore, the management provider 166 may be mounted in dedicated hardware (such as an integrated circuit chip).

All ports mounted on the Fibre Channel interfaces 155 in the storage controller 150 are managed by the volume the management program 162, using the port management table 167 (FIG. 5). The port management table 167 retains: a port name 167a which is unique for each port; an alias 167b which is arbitrarily set by the administrator; port attributes 167c; and a list of achievable port names 167d. The port attributes 167c are assigned to a port identified by the port name 167a.

For example, when the port accepts access from the physical server, "Target" is set to the port attributes 167c; and when the port is configured for external connection, "External" is set to the port attributes 167c. The achievable port name list 167d retains port names in a state capable of sending/receiving data to/from the relevant port. Therefore, if connectivity of both ports is secured logically, port information can be described in the port name list 167d even if data is not actually sent or received between the ports. However, even if the port is physically connected to a port of the storage apparatus, that port should not be described in the port name list 167d with respect to a range for which data transmission or reception is not permitted as a result of zone-based access control by a network switch as described later.

Furthermore, when defining a storage domain in the storage domain definition table shown in FIG. 4, the administrator may obtain a record corresponding to the storage-side port name 165b from the port management table 167, select a port to connect to the storage-side port from the port name list 167d, and sets it as the host-side port name 165c.

Characteristic functions of the storage apparatus are realized by each program in the storage controller 150 of the first storage apparatus 100. An external connection function as one of these characteristic functions is realized as follows. A volume of the second storage apparatus 200 is provided to the first physical server 10 via the network 52 between the first storage apparatus and the second storage apparatus as if it were a volume in the first storage apparatus 100.

Conventionally, the first physical server could use a volume(s) provided by the second storage apparatus only by performing inter-volume data copying between the first storage apparatus and the second storage apparatus, which requires a long time; however, the external connection function does not require the inter-volume data copying and is realized by redirecting access, which has been made from the first physical server 10 to the first storage apparatus 100, to the network mutually connecting the first storage apparatus 100 and the second storage apparatus 200 and further returning a response from the second storage apparatus 200 through the intermediary of the first storage apparatus 100 to the first physical server.

The following method can be assumed as a method for implementing the external connection function in the storage apparatus. Volume(s) in the target second storage apparatus 200 to which the external connection is applied are set so that they can be used through a port logically different from a port connected to the second physical server 20. How to do this is the same as the case where volumes are provided to a physical server. Furthermore, the network (for example, the communication path 52) for mutually connecting the first storage apparatus 100 and the second storage apparatus 200 is provided and a target volume is logically associated with a volume for the external connection within the first storage apparatus 100.

This volume for the external connection is defined in the first storage apparatus 100, but no actual physical storage devices (for example, the physical drives 101 or 102) are allocated to that volume, so that it is called a virtual volume. However, even a virtual volume can use the cache and the copy function in the same manner as other volumes in the first storage apparatus 100. The volume for the external connection is defined by the volume control program 162 and is registered in the volume definition table 163. For example, if a volume whose device identifier 163*a* is "20:01" in FIG. 2 is the volume for the external connection, "External" is set to the volume type 163*b* and necessary information to access the volume in the second storage apparatus 200 is registered in the source device field 163*c*.

Referring to FIG. 2, the source device field 163*c* shows that a volume which can be accessed from a storage port (alias "SPort#2") of the first storage apparatus via LUN 1 is a volume in the second storage apparatus 200 (having the physical storage devices). Therefore, when the first physical server 10 issues access to the external connection volume "20:01," the response program 160 refers to the volume type field 163*b* and identifies it as the externally connected volume and the redirect program 161 transfers the access to the source device, thereby enabling reading/writing of the volume in the second storage apparatus 200.

Examples of copy functions of a storage apparatus(es) include: a replication function that creates a duplicate volume between storage apparatuses via a SAN; a remote copy function that creates a duplicate volume between storage apparatuses at different sites by using a wide area network; and a volume backup function that creates a duplicate volume within a storage apparatus.

Examples of storage capacity efficiency functions include: a volume snapshot function that saves only a changed part of a specified volume to another volume; and a volume thin provisioning function that forms a pool by gathering a plurality of volumes and adds a capacity to the volumes in units smaller than the volumes in response to a write request from the physical server.

An example of a storage migration function is an online volume migration function that migrates the content retained by a certain volume defined in a chassis to another volume without stopping by performing volume copying and switching the identification information in cooperation with switching of an access path.

These functions are applied to volumes as targets and are managed by a volume type 557*d* in a volume management table 557.

The second storage apparatus 200 has the configuration similar to that of the first storage apparatus 100 because it realizes functionality of providing storage resources as volumes to the physical server 20. However, the external connection function is not indispensable for the migration method according to this embodiment, so that the first storage apparatus does not have to be equipped with the external connection function. The status where other storage-specific functions are mounted does not have to be the same in both the first storage apparatus and the second storage apparatus.

A communication path (storage area network) 50 using the Fibre Channel is to make the first physical server 10 access storage resources provided by the first storage apparatus 100 and transfer data used by the first physical server 10. For example, a Fibre Channel switch 55 may exist at the above-described network in order to mutually connect a plurality of physical servers 10 or a plurality of storage apparatuses 100. Furthermore, if devices connected to this network can be interpreted, the network may be used not for the purpose of use by the applications on the physical server 10, but for the purpose of, for example, transferring control information for controlling the devices themselves.

Furthermore, connection standards for configuring all networks described below are not limited to the Fibre Channel and such networks may be substituted with networks in conformity with other standards such as Ethernet or InfiniBand as long as they can mutually connect the physical server and the storage apparatus or between the storage apparatuses.

A communication path 51 using the Fibre Channel is a network for making the second physical server 20 access storage resources provided by the second storage apparatus 200 and transferring data to be used by the second physical server 20 to the second physical server.

Furthermore, a communication path 52 is provided between the communication path 50 and the communication path 51 for the purpose of mutually connecting the first storage apparatus 100 and the second storage apparatus 200 and enabling the first storage apparatus to use the external connection function. As shown in FIG. 1(*a*), the communication path 52 may be configured in a form to mutually connect the Fibre Channel switch 55 and the Fibre Channel switch 65 or may be configured in a form to directly connect a network port of the first storage apparatus 100 and a network port of the second storage apparatus 200. For example, mutual communication between the first physical server 10 and the second storage apparatus 200 is not indispensable, except mutual connection between the above-mentioned storage apparatuses. So, to enable this mutual communication cannot be the reason to add the communication path 52.

A network using the Fibre Channel statically has a unique address called a WWN (World Wide Name) at each network port of an individual network adapter (host bus adapter [HBA]). There is one WWN across a plurality of devices and there is no redundant WWN over the same network. Furthermore, when a network port is connected to the network, a dynamic address called an arbitrated loop physical address or a native address identifier is assigned to the port, depending on topology. These addresses are disclosed within a range permitted by access control and arbitrary equipment which is logically connected to the same network can refer to such addresses. Unless otherwise specified, the WWN or its alias (another name used at equipment over the network) is used in this embodiment; however, the techniques and methods disclosed in this embodiment are not limited by the type of an assigned address. The above-mentioned addresses correspond to a MAC address and an IP address over an IP network and do not limit an applicable range of this embodiment to the Fibre Channel.

As shown in FIG. 1(a), the management computer 500 includes at least a CPU 511 for executing programs in the memory 512 and an Internet interface 516 for communicating with other devices in the information system and executes necessary processing for managing other devices.

A communication path 90 connected by the management computer 500 via the Internet interface 516, or more precisely by using a network port on the interface, configures a network for sending/receiving necessary data to/from other devices (for example, the first physical server 10, the first storage apparatus 100, and the Fibre Channel switch 55) mainly in order for the management computer 500 to manage the configuration of the other devices of the information system.

This network does not have to be a single network. In order to configure the network necessary for processing required by a client computer, for example, a physically different Internet interface or a network port of that interface may be prepared separately, or the network may be logically divided by using a virtual LAN technique. The same type of network for mutual communication of the physical servers may exist. Furthermore, an Ethernet switch 91 for mutual connection of the respective devices may exist in the communication path 90.

Figure 1C:
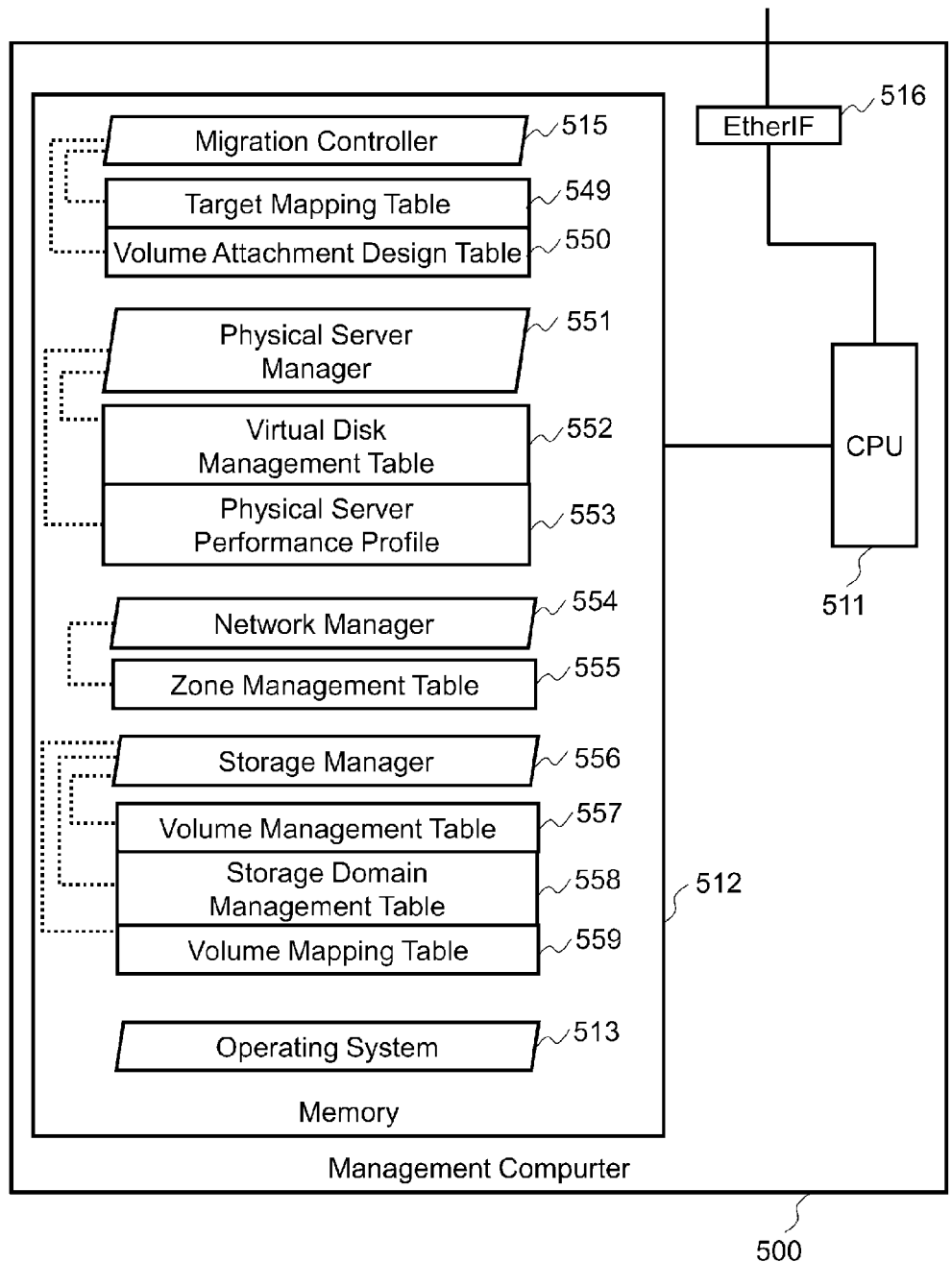
FIG. 1c is a block configuration diagram of a management computer.

The management computer 500 stores at least one or more Operating Systems 513 and at least one or more management programs 514 and at least one or more migration controllers 515 in the memory 512. The detailed program configuration is shown in FIG. 1(c). The management programs 514 are classified into at least one or more physical server managers 551, at least one or more storage managers 556, and at least one or more network managers 554. If the management program(s) 514 can communicate with the migration controller(s), these programs may exist and operate in a different management computer 500 or devices other than the management computer or may be divided at a plurality of locations depending on management targets. The management programs 514 are supplied by a vender who developed and manufactured each device or are compatible with these developed and manufactured devices.

The physical server manager 551 manages physical server(s) and virtual server(s) configured in the physical servers. For example, regarding the first physical server 10, the physical server manager 551 communicates with a physical server management provider mounted in the virtualization software 14 or the OS 13 of this physical server and thereby obtains configuration information and performance information of the physical server and changes its configuration. The physical server management provider is incorporated into the physical server from the beginning by the vender who supplies the server. The physical server manager 551 mainly manages the configuration and performance information of the physical servers by using a virtual disk management table 552 and physical server information 553. The details of the virtual disk management table 552 are shown in FIG. 6. The virtual disk management table 552 is used to record the locations of virtual disks connected to virtual servers and retains a physical server identifier 552a indicating the physical server where the relevant virtual server is located, a virtual server identifier 552b, a shared volume group 552c, a virtual disk identifier 552d, a virtual disk type 552e, a path 552f indicating the location of the virtual disk in the file system, a located logical volume 552g, a connection location 552h of a storage location disk drive for the physical server, a device identifier 552i assigned to that disk drive, and a connection destination port name 552j on the network interface. All these pieces of configuration information can be obtained from the OS or the virtualization program on the physical server.

The shared volume group 552c indicates the configuration, in which a plurality of physical servers connect to the same volume, and means a group of physical servers for enabling migration of a virtual server between the physical servers for the purposes of load distribution and maintenance.

There are a plurality of formats of virtual disks. A first format is a format in which files are stored in volumes (recognized as a physical disk drive by the physical server) mounted on the physical server. The physical server recognizes the volumes as the physical disk drives. A virtual disk of the first format contains files that can be created with, for example, fixed capacity, variable capacity, and differential capacity, respectively. A second format is a format in which volumes are connected as physical disk drives to the virtual server.

If a virtual disk is configured in the file format, the virtual disk management table 552 further retains the path 552f which indicates the location in the directory structure. A file system is sometimes configured by further dividing the inside of the disk drives into one or more logical volumes (or partitions) and the physical server retains the logical volume 552g, which is a storage location of the logical volumes, in order to manage the logical volumes.

The disk drive connection location 552h is expressed in accordance with the SCSI standards by combining the LUN, which is determined by the OS or the virtualization program, and identification numbers of the target and a SCSI bus.

The port name (WWN) which is used to connect to a SAN (such as the communication path 50 or the communication path 51) is retained in the connection destination port name field 552j. If a plurality of access paths exist with respect to the connection destination port name 552j and, for example, if multi-path(s) or link aggregation is introduced for the purpose of enhancing reliability and performance, a plurality of port names may be registered in the field 552j or the port names may be divided into a plurality of records and these records may be retained in the field 552j.

The operating system or the virtualization program assigns a unique device number 552i to the disk drive by, for example, using the device identifier 163a which the physical server can obtain from the storage apparatus.

The virtual disk management table may further retain a flag for identifying whether a built-in disk drive or a storage apparatus via a SAN, or the type of a connection interface (such as IDE or SCSI) with them, or the type of a file system; or if a virtual disk of the file format is retained in a file server over the network, a flag for identifying it may be retained in the virtual disk management table. However, these pieces of configuration information are limited to those which can be managed by the OS or the virtualization program on the physical server.

The physical server information 553 shown in FIG. 7 is designed so that a record created for each physical server is associated with a table created for virtual server(s) on the relevant physical server for the purpose of recording performance information of the physical server and the virtual servers.

The performance information of the physical server retains, for example, the number of logical CPU cores 553c, a memory capacity 553d, a network bandwidth 553e, a disk I/O bandwidth 553f, and a port name list 553g for SAN connection corresponding to a physical server identifier 553a, together with time 553b when the information was obtained by the physical server manager 551. Regarding these pieces of the performance information of the physical server, other parameters may also be retained as necessary only with respect to those which can be obtained by the physical server manager 551.

The performance information of the virtual server retains, for example, the number of logical CPU cores 553j, CPU average usage 553k, a memory capacity 554m, a network bandwidth 553n, a network average transfer rate 553p, a disk I/O bandwidth 553q, a disk average I/O rate 553r, and disk usage 553s that are assigned corresponding to a virtual server identifier 553h on the physical server, together with the status of the virtual server (for example, in operation or Stop 553i. Regarding these pieces of the performance information of the virtual server, other parameters may also be retained as necessary only with respect to those which can be obtained by the physical server manager 551.

For example, if the virtualization program 14 uses a technique for dynamically changing the memory to be allocated to a virtual server, depending on load on, for example, the virtual server (memory ballooning), the dynamic memory capacity may be added to the performance information of the virtual server. The physical server manager 551 calculates the used amount of resources consumed in the physical server and the performance by summing up the performance information about the virtual server on the physical server. However, if the virtualization program or the OS consumes the resources of the physical server separately from the virtual server, this may be taken into consideration for the calculation.

The storage manager 556 manages storage apparatuses. For example, the storage manager communicates with the storage management provider 166 provided in the storage controller 150 of the first storage apparatus 100 and can thereby obtain the configuration information of the storage apparatus and change its configuration.

In this embodiment, the storage manager 556 manages the configuration of storage apparatuses by using the volume management table 557, a storage domain management table 558, and a volume mapping table 559 (see FIG. 1(c)). Additionally, if necessary, the storage manager 556 can refer to the allocation management table 164 and the port management table 167 of the storage controller 150 and change their settings.

The volume management table 557 shown in FIG. 8 retains configuration information corresponding to the content of the volume definition table 163 which the storage apparatus has in the storage controller. However, in addition to the content of the volume definition table 163, the volume management table retains a storage serial number 557b for uniquely identifying the relevant storage apparatus and a volume name 557a for uniquely identifying the relevant volume with respect to all the storage apparatuses which are targets of the storage manager 556.

These identifiers are added because the volume management table 557 needs to manage volumes with respect to one or more storage apparatuses, while, for example, the volume definition table 163 of the first storage apparatus 100 manages only volumes within the same apparatus.

As long as the volume name 557a is unique, a naming convention may differ depending on the implementation of the storage manager 556 in the management computer. For example, when adding a record to the volume management table 557, the storage manager 556 may generate a volume name so as to form a serial number or may generate a volume name by combining the storage serial number 557b and the device identifier 557c.

Furthermore, the storage manager 556 can set validation/invalidation of the cache with respect to each volume by operating the volume control program 162 and may retain this information in the volume management table 557.

The storage domain management table 558 shown in FIG. 9 retains configuration information corresponding to the content of the storage domain definition table 165 which the storage apparatus has in the storage controller. The storage domain management table 558 retains a storage serial number 558b for uniquely identifying the relevant storage apparatus and a volume name 558g for uniquely identifying the relevant volume with respect to all the storage apparatuses because of the same reason as the case of the volume management table 557.

The volume mapping table 559 shown in FIG. 10 retains the connection relationship between volumes in preparation for the use of the functions of storage apparatuses by the management computer or the server across a plurality of storage apparatuses. This table retains a mapping source storage serial number 559a, a mapping source volume name 559b, a mapping source port name 559c, a mapping destination storage serial number 559f, a mapping destination volume name 559g, and a mapping destination port name 559h, together with a mapping type 559d and the status 559e.

For example, a first record associates a volume, which is located in a device with a serial number "201" and whose volume name is "10220," with a volume, which is located in a device with a serial number "101" and whose volume name is "00401," by means of the external connection function and shows that the status is "Online." Accordingly, it can be found that access to the (virtual) volume managed with the volume name "00401" is redirected normally by means of the external connection function to the volume managed with the volume name "10220." Furthermore, a record on the second row is an example showing application of volume copying (replication) between the storage apparatuses.

The network manager 554 manages network device(s). For example, the network manager 554 communicates with a network management provider of the Fibre Channel switch 55 and thereby obtains configuration information from the network device and changes its configuration information. This management provider is incorporated into the device from the beginning by a vender who supplies the network device.

In this embodiment, the network manager 554 manages an access range controlled by the Fibre Channel switch 55 by mainly using a zone management table 555 (see FIG. 1(c)).

Like the aforementioned storage domain, the technique for controlling the range to which a physical server can access is used in the storage apparatus. For the same purpose, a switch over the network has a function controlling a range to which access can be made across storage apparatuses or physical servers.

Regarding storage network management using the Fibre Channel, an access control technique called zoning is known. There are two main types of zoning. One type is hardware zoning that defines a fixed range (zone) for permitting only devices over the network physically connected to a specified port to mutually connect, by using a network port name (or alias) of a switch. Another type is software zoning that defines a range in which only devices with network port names (or aliases) over the network can mutually connect, by using the network port names (or aliases) of the devices over the network regardless of to which port of the switch the devices are physically connected.

The zone management table 555 shown in FIG. 11 retains a zone name 555a for uniquely identifying a zone, a switch identifier 555b for uniquely identifying a Fibre Channel switch, and a port name list 555d indicating one or more ports, and a zone type 555c (hardware zone or software zone). Regardless of which zone type, any zone type can be managed by the table of the same format.

The migration controller 515 is a characteristic program of the present invention and realizes migration of the virtual server between physical servers and migration of a virtual disk between storage apparatuses by cooperating with the physical server manager 551, the storage manager 556, and the network manager 554. The migration is performed by using a connection means (such as an IP network or inter-process communication) capable of mutual connection between a migration source and a migration destination, and a management interface disclosed. The migration controller 515 manages the connection relationship between virtual servers and virtual disks by using a target mapping table 549 and a volume attachment design table 550 and maintains this connection relationship before and after the migration.

The target mapping table 549 shown in FIG. 12 is used to manage the connection relationship between virtual servers, virtual disks and volumes and retains at least the number of records equal to the number of virtual disks that can be recognized by the physical server manager 551. Therefore, each record always includes a physical server identifier 549a, a virtual server identifier 549c, a virtual disk identifier 549d, and a storage location volume name 549k.

Other identification parameters may be included in the records if they are necessary for the migration and as long as they can be obtained indirectly from the management software 514 or directly from the management provider. For example, a shared volume group 549b, a path on the file system 549e, a disk drive connection location 549f, a physical-server-side port 549g, a zone name 549h, a storage-side port 549i, and a storage domain 549j may be included.

Furthermore, if there are a plurality of physical server managers 551, storage managers 556, and network managers 554 and there is a possibility of redundant identifiers, the procedure executed by the migration controller 515, which creates the target mapping table 549, for changing the identifiers to non-redundant identifiers may be included.

The volume attachment design table 550 shown in FIG. 13 retains settings of how migration target volume(s) at migration destination(s) should be connected to physical server(s). This table 550 retains, with respect to a volume name 550a of a volume migrated (or scheduled to be migrated), a migration destination volume name 550b, a physical server identifier 550c of the migration destination, a disk drive connection location 550e, and a port 550d of a connection destination physical server; and creates the number of records equal to the number of paths defined between volumes at the migration destination and ports on the physical server.

2. Configuration Information Acquisition Method

In order for the management computer to migrate a virtual server by using the function(s) of storage apparatuses, when a certain virtual server at a migration source is designated as a migration target, it is necessary to specify a volume, to which the functions of storage apparatuses should be applied, that is, a migration target volume which stores a virtual disk used by the relevant virtual server. However, as described earlier, programs for managing the respective devices such as storage apparatuses, servers, or networks are basically specialized and designed to manage layers such as servers, networks, or storage apparatuses for which they are responsible. Therefore, generally, no program capable of managing across a plurality of layers constituting the system exists.

Furthermore, in order for the storage manager 556 to apply the functions of storage apparatuses to a migration target volume, the administrator has to designate a target volume by using an identifier (for example, the volume name 557a) which can be interpreted by the storage manager 556. However, there is no guarantee that the identifier used by the physical server manager 551, which manages the locations of virtual disks, in order to specify a volume as a physical disk drive is the same as the identifier used by the storage manager 556. For example, the physical server generates a device identifier including a response for a SCSI Inquiry command or a volume-specific identifier (for example, the device number 552i) based on the device identifier, while the storage manager 556 uniquely generates the volume name 557a as a logical identifier for management.

The reason for this is, for example, that because volumes which are not disclosed to the storage apparatus or the physical server exist, these volumes have to be logically distinguished. For example, when the storage apparatus is equipped with a function that makes a volume such as a copied volume, which is physically different from a copy source volume, take over a device identifier of the copy source volume and changes an access target volume without making the physical server become aware of a configuration change, that is, an online volume migration function, the device identifier determined by the SCSI standards would be the same, but the copy source volume and the copy destination volume have to be operated as different volumes in terms of storage management and another identifier for the management purpose should be provided separately from the device identifier (the identifier disclosed to the physical server).

So, the management computer identifies and specifies a volume not based on a device-specific identifier, but based on location information used when connecting the volume to a physical server. For example, the LUN which is assigned for each HBA port according to the SCSI standards corresponds to the location information. While the device-specific identifier is unique among all devices, the LUN is unique for a (physical-server-side) port of an initiator.

The device-specific identifier is always unique and the device-specific identifier can also correspond on a one-to-one basis to the content recorded in the volume. The device-specific identifier is used to identify the identity of a volume as seen from the physical server, for example, when the volume is shared by a plurality of physical servers or when multi-path software for controlling a plurality of paths for the same volume is configured. The server can examine the identity of the volume based on the device-specific identifier according to an Inquiry command without reading the entire content of connected volumes and comparing the volumes. Such a device-specific identifier is generally used for identification operation inside the server device and is not disclosed to the management program outside the device. Accordingly, when examining this device-specific identifier, it is necessary to introduce a program (agent), which is capable of issuing an Inquiry command, to the physical server and specially providing an interface.

On the other hand, the LUN is one type of a dynamic address simply indicating in what number of order the relevant volume (logical unit) is connected so that the physical server can access the volume; and is not used for the purpose of identifying the content of the volume across a plurality of servers. For example, a route for a physical server to connect to a volume can be changed as in a case where, for example, a volume which has been mounted in a certain physical server can be made to be used in another physical server by assigning an LUN which is different from its former LUN.

The identifier indicating a port and the LUN are necessary address information to realize connection between the respective devices as determined by the SCSI protocol and can be easily obtained by the management program 514 on the management computer 500 via the management provider of each device. It is an out-of-band method because the management provider or the management program specifies the address information through the network outside the device.

Figure 14:
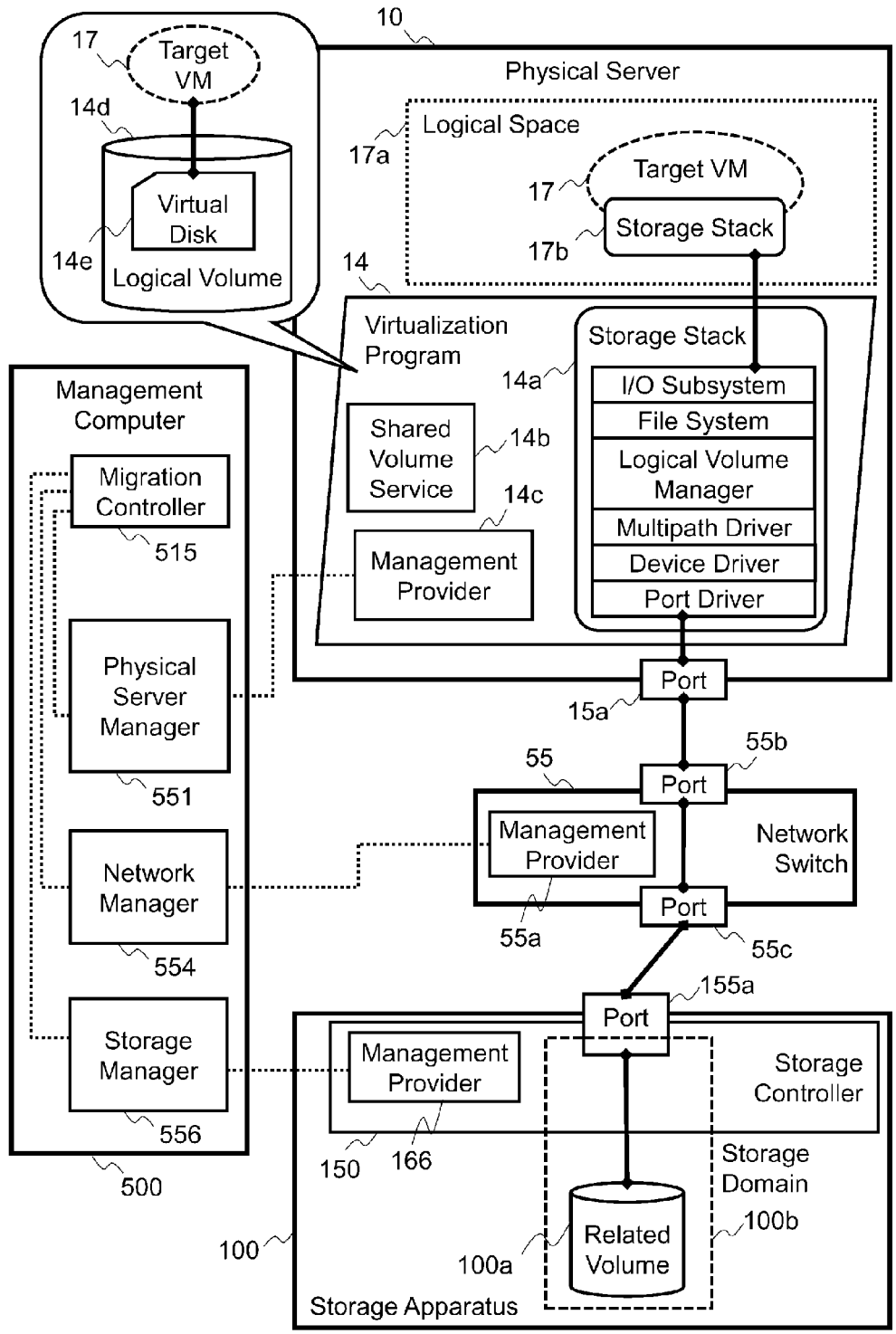
FIG. 14 shows a connection configuration of management target devices according to an embodiment of the present invention.

FIG. 14 illustrates the configuration of the physical server 10, the Fibre Channel switch 55, and the storage apparatus 100. The management program 514 on the management server 500 obtains the configuration information in each device through the management provider 14c, 55a, 166 in each device.

A virtual server 17 operates in a logical space 17a provided by the virtualization program 14. There are various implementation methods of the virtualization program 14. Hardware of the physical server is provided as certain logically divided hardware to users. The logically divided hardware operates in the logical space 17a.

As shown in this drawing, for example, access to a disk is made via hardware abstracted by a hierarchized structure called a storage stack 14a. Similarly, a virtual server whose content is to operate in the logical space obtained by dividing the hardware also accesses the virtual disk via the storage stack 17b realized by the OS of the virtual server.

In the case of this drawing, a virtual disk 14e used by the virtual server 17 is managed as a file of the file system defined on a logical volume 14d by the storage stack of the virtualization program 14. The virtual disk 14e is recognized by the virtual server 17 as if it were a physical disk drive connected via the storage stack 17b.

Depending on how the virtualization program 14 is mounted, there is also a format in which a logical volume is directly accessed without the intermediary of the file format (path-through-disk format) for the purpose of avoiding overhead mainly caused by access to the logical volume through the intermediary of a plurality of layers of the storage stack.

A storage area in a layer at or below a logical volume manager of the storage stack 14a is managed as one volume (or physical disk drive). A multi-path driver controls a plurality of paths for the same volume and realizes load distribution or fail-over of disk access. A device driver or a port driver absorbs the difference between the storage apparatuses and the network adapters and enables access from an upper-level layer in the same manner by a READ/WRITE command regardless of the mounting form of such equipment in the server.

As explained earlier, the management computer uses, as volume specifying information, an LUN which is information specifying the connection location of the volume and can be obtained from the device driver (or a logical volume manager), and a port WWN which can be obtained from the port driver. If the path used by the multi-path driver is changed dynamically, port information may sometimes be concealed from upper layers, so that a currently used port is specified by referring to path control information managed by the multi-path driver.

On the other hand, a storage domain 100b is defined in the storage apparatus 100 and the storage domain is associated with a port 15a on the host (physical server 10) side. Furthermore, at which LUN a volume 100a is provided to the physical server 10 (or the host-side port 15a) is defined in this storage domain 100b.

Furthermore, the virtualization program 14 retains information indicating which LUN is assigned to a physical disk drive that stores the virtual disk 14e used by the virtual server 17. Here, the volume in the storage apparatus 100 which is used by the virtual server 17 is uniquely specified by comparing the LUN used by the physical server 10 with the LUN, which is set on the storage apparatus 100, with respect to the host-side port 15a.

The Fibre Channel switch 55 performs various access control of a plurality of devices over the network by using zones. If the plurality of devices are related to migration of a virtual server and a virtual disk, for example, zone(s) may be configured so that a shared volume can be accessed in the same manner by a switch of the migration source and a switch of the migration destination. In order to do so, it is necessary for the network manager 554 to obtain zone configuration information via the management provider 55a and create the zone management table 55.

Figure 15A:
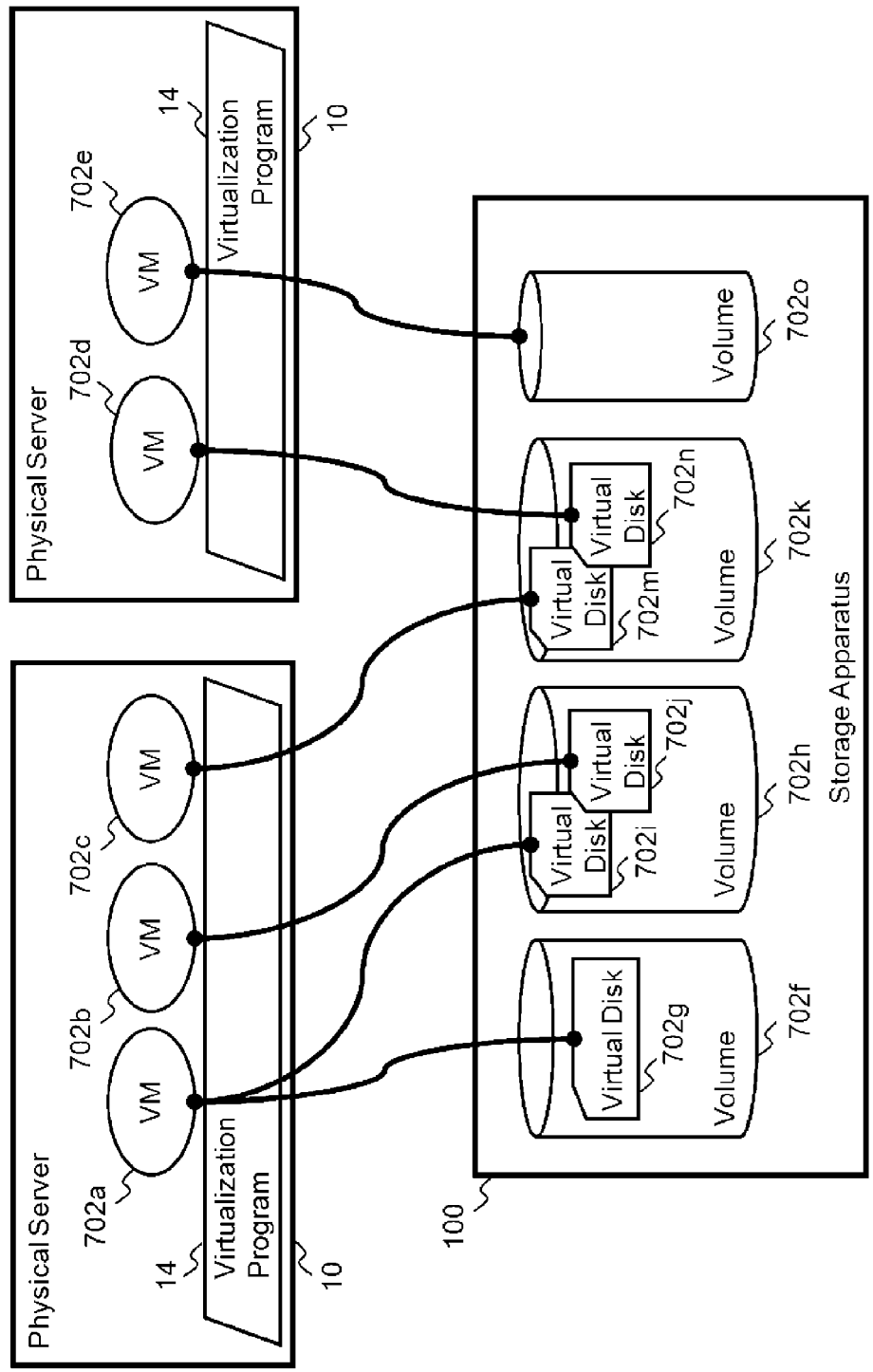
FIG. 15a is a first block diagram showing the connection relationship between virtual servers and virtual disks.

A virtual server, a virtual disk, and a volume storing the virtual disk do not necessarily correspond to each other on a one-to-one basis. So, when migrating a virtual server between servers and accordingly migrating a virtual disk between storage apparatuses, it is necessary to take the mutual dependence relationship between a plurality of virtual servers and a plurality of volumes into consideration. So, a configuration example showing the relationship between virtual servers and volumes will be explained. As shown in FIG. 15(a), various forms of dependence relationship exist as a virtual server has a plurality of virtual disks or the plurality of virtual disks are stored in the same volume, or further according to the type of the virtual disks.

Referring to FIG. 15(a), a virtual server 702a stores a plurality of virtual disks 702g and 702i in separate volumes 702f and 702h. Therefore, when the virtual server 702a is designated as a migration target, the management computer detects that both the volumes 702f and 702h also become migration targets.

Furthermore, the volume 702h also stores a virtual disk 702j used by a virtual server 702b. So, when the virtual server 702a is designated as the migration target, there is a possibility that the virtual server 702b might also become a migration target.

Furthermore, if a virtual server 702c and a virtual server 702d which share the same volume 702k exist in different physical servers, the management computer has to detect this appropriately and perform migration.

If a plurality of virtualization programs share the same volume, a shared volume service 14b operates (the details of the shared volume service 14b will be explained in Embodiment 2).

The dependency relationship between these virtual servers and volumes is clarified by comprehensively analyzing the correspondence relationship retained by the virtual disk management table 552.

Furthermore, the same applies to a case like a virtual server 702e where the virtual disk is not of the file format, but is of the path-through-disk format which directly uses a volume 702o. The type of these virtual disks is identified according to the virtual disk type 552e in the virtual disk management table 552.

On the other hand, the function(s) of the storage apparatus also become migration targets along with migration of a virtual server as shown in FIG. 15(b). Since a virtual server 702p uses a volume 702s and the volumes 702s and 702t have a copy pair relationship using a volume backup function, these two volumes are simultaneously migrated to a migration destination storage apparatus as necessary.

Since a volume 702v used by a virtual server 702q is a snapshot of a parent volume 702u, which is created by using a volume snapshot function, the snapshot is integrated with the parent volume 702u at the time of migration or both the volumes are migrated at the same time with their snapshot relationship maintained.

Furthermore, since a volume 702x used by a virtual server 702r is originally externally connected to a volume 702w or copied between the storage apparatuses, the volume 702x may be integrated with the volume 702w as necessary or they may be migrated with their relationship maintained. Their configuration is apparent from the volume management table 557 and the volume mapping table 559.

In this way, virtual servers, virtual disk, and volumes have various forms of dependency relationship. The migration method for the computer system shown in FIG. 1 provides a method for detecting these forms of dependency relationship. However, combinations which require simultaneous migration may only be listed based on the detected dependency relationship and whether actual migration should proceed or not may be left to the discretion of the administrator.

3. Migration Method

Figure 16:
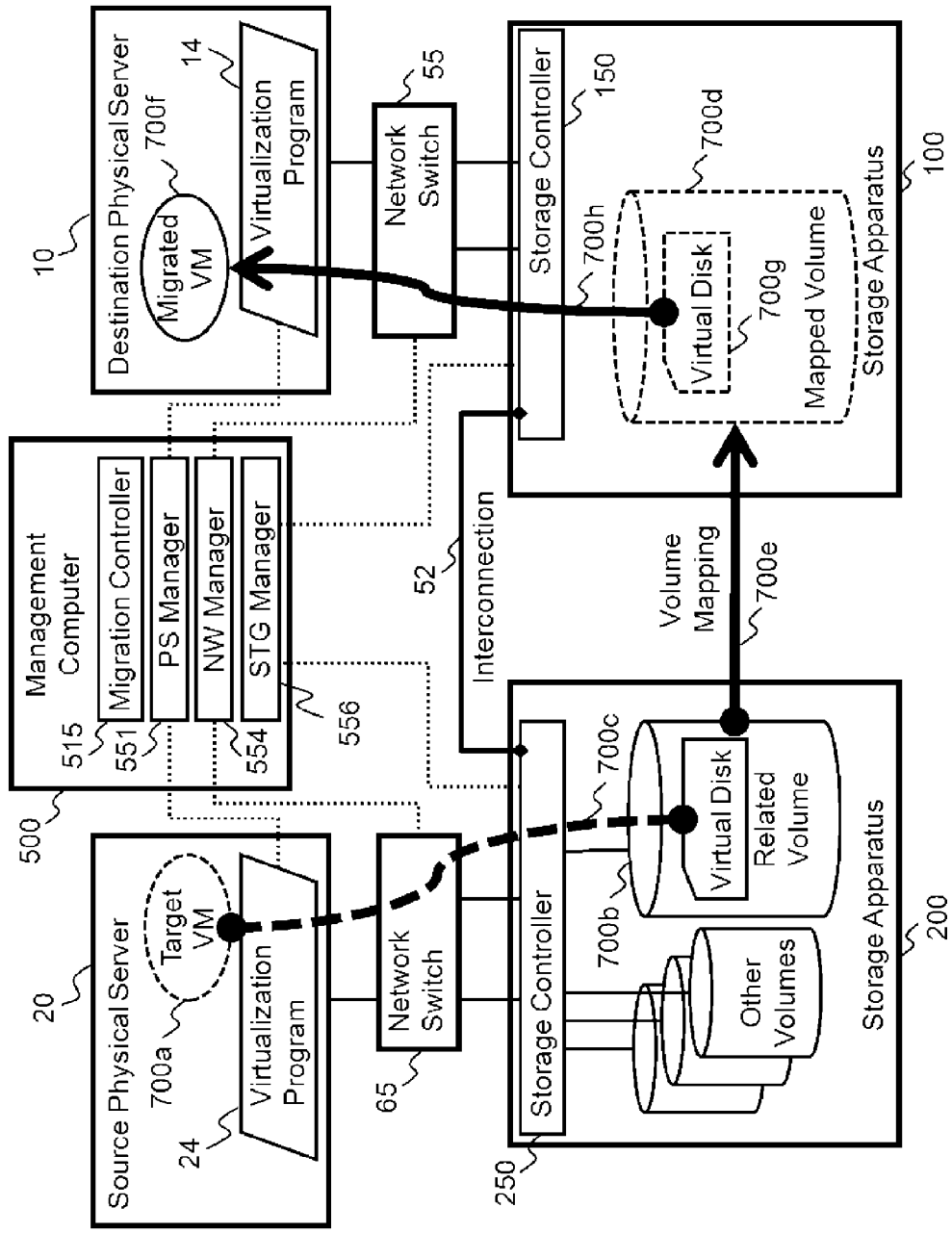
FIG. 16 is a block diagram of a computer system for migrating a virtual server and a virtual disk according to a first embodiment of the present invention.

A system for migration is shown in FIG. 16. The migration controller 515 of the management computer migrates a virtual server 700a, which operates on the second physical server 20 (source physical server; virtual server migration source) to the first physical server 10 (destination physical server; virtual server migration destination). At the same time, the migration controller 515 migrates a volume 700b in the second storage apparatus 200, which stores a virtual disk used by the virtual server 700a, to a volume 700d in the first storage apparatus 100 and reconnects a virtual disk 700g which has been originally used in the migration source virtual server 700a to the migration destination virtual server 700f. As a result, the computer system can migrate the virtual server and the virtual disk to the physical server and the storage apparatus which are different from the migration source by using the functions of the storage apparatus, that is, the cooperative function between a plurality of storage apparatuses and, for example, the aforementioned external connection function, while maintaining the pre-migration connection relationship between the virtual server and its virtual disk.

In the pre-migration state, the second physical server 20 and the second storage apparatus 200 are mutually connected and the virtual server 700a operates on the second physical server 20 and the virtual disk of the virtual server 700a operates in the second storage apparatus 200. In this circumstance, the second physical server 20, the second network switch 65, and the second storage apparatus 200 are managed by the physical server manager 551, the network manager 554, and the storage manager 556, respectively, in the management computer 500.

In order to execute the migration processing, the migration controller 515 obtains the configuration information from each of the second physical server 20 which is the migration source, the second storage apparatus 200, and the second network switch 65 via those management programs 514. The migration controller 515 manages the obtained configuration information in the target mapping table 549; and if a migration administrator designates the virtual server 700a to be migrated, the migration controller 515 specifies the volume 700b storing the corresponding virtual disk.

Subsequently, the administrator designates the migration destination physical server and, if necessary, the storage apparatus to the management computer 500. The migration controller 515 retains the designated content in the volume attachment design table 550. This table includes not only a field for the migration destination physical server, but also fields about the logical location and the network port; however, they may be calculated by the migration controller 515 in accordance with a specified algorithm or may be set by the administrator. The algorithm may be of the known content and may be an algorithm having the ability to judge whether or not the migration destination physical server and the migration destination storage apparatus have an unused capacity equivalent to a total capacity of required resources which is estimated by referring to the physical server information 553 with respect to at least the migration target virtual server.

If the first physical server 10 and the first storage apparatus 100 are designated or decided as migration destinations, the migration controller 515 operates each device including the first network switch 55 via each management program 514 and sets a communication path so that the storage resources of the first storage apparatus 100 can be normally provided to the first physical server 10. This setting includes zoning at the first network switch 55 and the setting of storage domains in the first storage apparatus 100. If necessary, the management computer or the administrator may newly register the first physical server 10, the first storage apparatus 100, and the first network switch 55 as management targets of their respective management programs 514 before the migration processing and perform the procedure for making each device operable by the management computer 500. If this registration has already been made, the management computer may perform the procedure for obtaining the latest configuration information and update each management table in order to ensure accurate logical configuration of the devices.

The management computer uses the cooperative function between the first storage apparatus 100 and the second storage apparatus, for example, the external connection function of the first storage apparatus 100, in order to migrate data retained by the volume 700b between the storage apparatuses 200, 100. Since the volume name 549k for identifying the volume 700b, which is the migration target, in the target mapping table 549 is originally the identifier 557a assigned by the storage manager 556, the management computer can set the external connection function of the first storage apparatus 100 from the storage manager 556 by using the volume name 549k.

The management computer cuts off connection 700c between the virtual server 700a in the second physical server 20 and all virtual disks and migrates the virtual server 700a to the first physical server 10. A migration means may be a method of transferring the virtual server, which the virtualization program 24 of the second physical server 20 has, over the network (communication path 90) by using a staticizing function (that is a function temporarily suspending the virtual server and saving information for management and the content of the memory in the file format) or a method of assigning main setting information to the first physical server 10 and creating another virtual server different from the migration source virtual server.

The main setting information means, for example, information relating to management of identifiers of virtual servers and owners and information relating to virtual hardware such as the number of virtual CPUs and interface configuration of virtual memories and virtual storage areas and at least serves to achieve the purpose of reproducing the function(s) that the migration target virtual server should achieve. These pieces of setting information are managed in the virtual disk management table 552 and the physical server information 553 and are reflected in the migration source physical server and the migration destination physical server. However, if the identifier of the virtual server is changed by recreating the virtual server, the management computer also modifies the virtual server identifier 552b in the virtual disk management table 552 and the virtual server identifier 549c in the target mapping table 549 along with the change of the identifier of the virtual server.

After the volume 700b is migrated to the first storage apparatus 100 and is then identified as the volume 700d by the first physical server, the migration controller 515 reconnects the virtual disk 700g, which is stored in the volume 700d, to the virtual server 700f which has been migrated to the first physical server 10.

After the migration, the migration controller 515 refers to the target mapping table 549 created at the migration source and detects a virtual disk with the virtual disk identifier 549d corresponding to the virtual server identifier 549c described in the same record in order to reproduce an appropriate connection relationship between the virtual server and the virtual disk. Now, the virtual disk identifier 549d detected by the migration controller 515 is sent to the physical server manager 551 for managing the migration destination physical server and is set to the virtual disk management table 552. Subsequently, this setting information is sent from the physical server manager 551 to an agent program in the migration destination physical server of the virtual server and is reflected in the management table of the memory in that physical server.

If the virtual disk identifier 549d is not described in the virtual disk and the identifier cannot be examined, the path 549e on the file system may be used. However, the location in the logical volume (such as a mount point or a drive letter) needs to be converted in accordance with the setting of the migration destination by referring to the volume attachment design table 550.

Value(s) which are set to the virtual disk management table 552 with respect to the migration destination physical server are actually reflected by the migration destination physical server manager 551 in the OS and the virtualization program in the physical server as described earlier. Similarly, for example, values such as the disk drive location which are set to the volume attachment design table 550 are set by the physical server manager 551 via the migration controller 515. Furthermore, values which should be set to the virtual disk management table 552 and the physical server information 553 and are not retained by the target mapping table 549 and the volume attachment design table 550 are additional information which is not directly necessary to reset the connection relationship between the virtual server and the virtual disk. Therefore, when the information about the aforementioned connection relationship is reflected in the physical server, this information may be automatically complemented by the OS and the virtualization program in the migration destination physical server 100 or automatically complemented by the migration controller 515 or the physical server manager 551.

Figure 17:
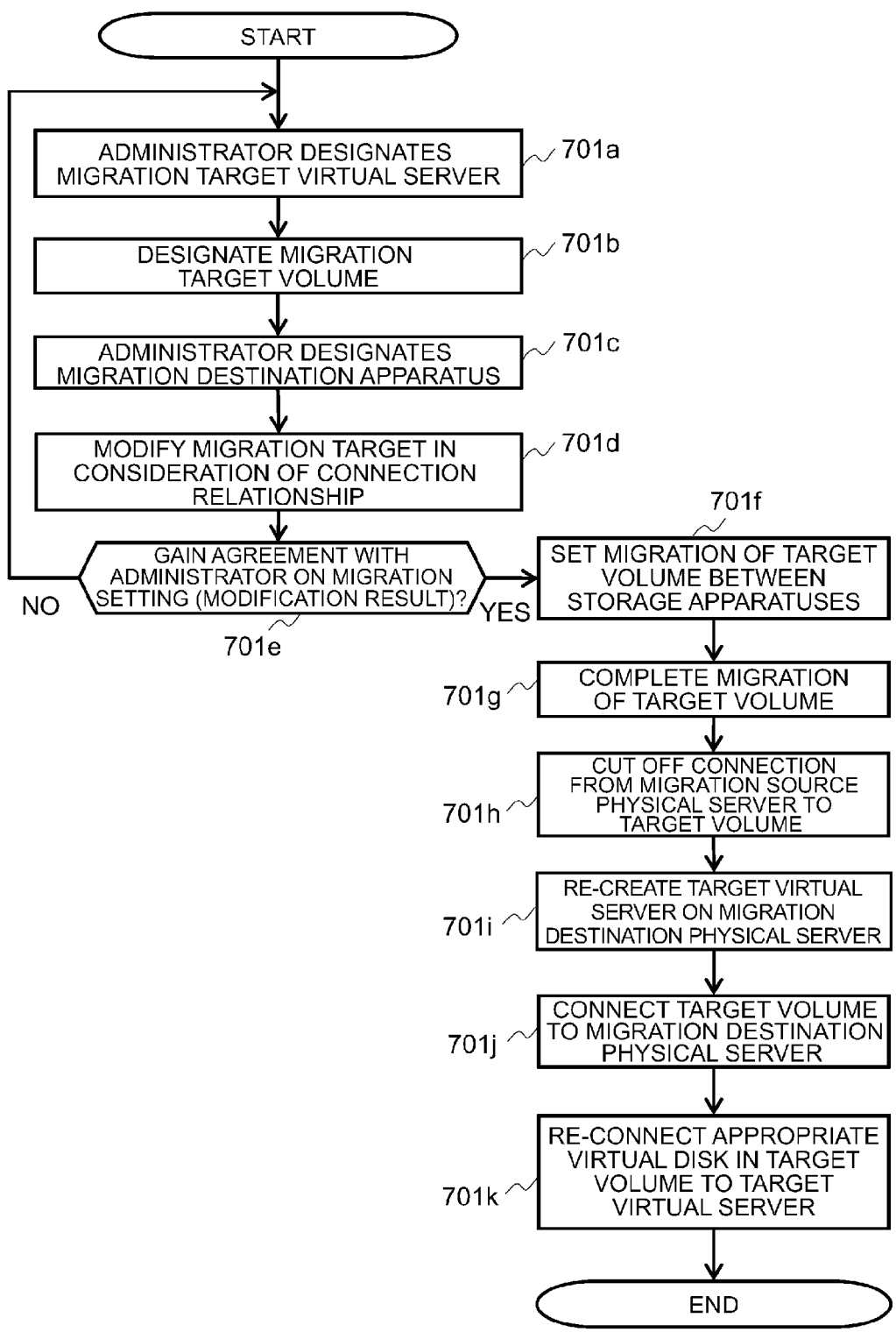
FIG. 17 is a processing flow diagram of the computer system in FIG. 16.

The detailed migration procedure will be explained with reference to a processing flow diagram shown in FIG. 17. In step 701a, the administrator who carries out the migration operation designates a virtual server, which is a migration target, to the migration controller 515.

The migration controller 515 obtains management information such as the virtual server identifier 552b of the second physical server 20, which is a migration source, and its virtual disk identifier 552d by using the physical server manager 551 in advance. The physical server manager 551 regularly invokes the management provider in the second physical server 20 and updates the management table so that it can always manage the latest configuration information; however, the physical server manager 551 may perform this update operation at the time of migration.

If it is necessary for authentication to obtain information from the management program 514 in step 701a, the migration controller 515 may demand that the administrator should input the administrator authorization registered in the management program 514. Since the acquisition of the configuration information of each device constituting the computer system by the management computer from each device is based on the out-of-band method as explained earlier, it is important to enhance security and prevent interception of information sent and received over the management network 90 by third parties.

In step 701a, the migration controller 515 firstly creates an empty target mapping table 549; and as triggered by designation of a virtual server as the migration target by the administrator, the migration controller 515 creates one record. Information relating to the migration source physical server 20 such as the physical server identifier 549a, the virtual server identifier 549c, the virtual disk identifier 549d, the path on the file system 549e, the disk drive location 549f, and the host-side port 549g is copied from the virtual disk management table 552 to the above-mentioned record.

In step 701b, the migration controller 515 refers to each configuration information of the second physical server 20, the second storage apparatus 200, and the Fibre Channel switch 6, which is provided by the physical server manager 551, the storage manager 556, and the network manager 554; and then edits the target mapping table 549 with respect to the migration target virtual server and the virtual disk, which are designated in step 701a; and designates the migration target volume name 549k.

The target mapping table 549 retains the disk drive location 549f, in which the virtual disk that is the migration target in step 701a is stored, and the host-side port 549g. With respect to these pieces of information, the migration controller 515 refers to the storage domain management table 558 through the intermediary of, for example, the storage manager 556, compares it with the host-side port name list 558d and the LUN 558e, and thereby designates the volume name 558g of the migration target.

The specified volume name 558g is copied to the volume name field 549k of the target mapping table 549. Furthermore, values of the storage-side port 558c, the storage domain name 558a, and the zone name 555a relating to the specified volume are also copied with respect to the port 549i connected to the migration target volume, the storage domain 549j, and the corresponding zone name 548h.

Now, the migration controller 515 may detect the dependency relationship between, for example, virtual servers and virtual disks as show in FIG. 15(a) and FIG. 15(b) mentioned earlier and add the virtual server and the volume, which should be migrated at the same time, as a new record to the target mapping table 549. As a method for detecting the dependency relationship, the migration controller 515 may sometimes search the virtual disk management table 552 and the volume management table 557 by using the specified volume as a key value and reversely look up information about the virtual server which should be migrated at the same time.

In step 701c, the administrator designates at least the first physical server 10, which is the migration destination, and, if necessary, the first storage apparatus 100, which is the migration destination, with respect to each migration target virtual server to the migration controller 515. Since the migration destination volume is automatically created as explained later, it is not designated in this step. Therefore, the migration controller 515 obtains the configuration information of each device via the physical server manager 551 and the storage manager 556 in advance.

Furthermore, the migration controller 515 creates the volume attachment design table 550 with respect to the migration target volume designated in step 701b in accordance with the designation by the administrator. The volume attachment design table 550 retains the migration setting indicating at which location of which first physical server 10 the migration destination volume should be connected. The migration destination physical server identifier 550c, the migration destination storage serial number 550d, the disk drive location 550e, and the host-side port name 550f, which are input by the administrator, or input by the migration controller 515 in accordance with a specified algorithm, to the volume name 550a of the migration target, are entered in the volume attachment design table 550.

The migration controller 515 has the storage manager 556 issue a volume, which is not a duplicate of other volumes, as a migration destination volume and the storage manager 556 enters this in the migration destination volume name field 550b. A method for inputting the setting items of the volume attachment design table 550 is, for example, as follows.

As the administrator refers to the target mapping table 549, which was created in step 701b, with respect to the virtual server designated by the administrator as the migration target in step 701a, the migration target volume name 549f can be obtained, thereby identifying the migration target volume name 550a of the volume attachment design table 550.

If the administrator designates the migration destination physical server 550c in step 701c, the migration controller 515 obtains the port name used by the migration destination physical server 550c from the port name list 553g of the physical server information 553.

The migration controller 515 uses this as a key and compares it with the host-side port name list 558d of the storage domain management table 558 in the migration destination storage apparatus 100. If a storage domain including the port name of the migration destination physical server has already been defined, the volume name 558g connected to the migration destination physical server 550c and its LUN 558e and the storage domain name 558a can be found. In this case, it is only necessary to define a new migration destination volume by assigning the LUN so that the relevant volume would not become a duplicate of other existing volumes in the existing storage domain.

If the relevant record does not exist in the storage domain management table 558, the migration controller 515 searches the port management table 167 for a record of the port name 167d which can be connected to the migration destination physical server and includes the port name of the migration destination physical server 10. If the migration controller 515 successfully detects the port to be connected to the migration destination physical server, the administrator creates a new storage domain at the relevant storage-side port and defines a new migration destination volume.

The status of use of the storage-side port is managed in the port management table 167 and the storage manager 556 can refer to this. However, the configuration information defined in the volume attachment design table 550 cannot be reflected to the device yet at the stage of step 701c, so that the configuration of the device is not actually changed.

The migration controller 515 can set the migration destination storage serial number 550d and the disk drive location 550e as described above. A plurality of paths may exist between the migration destination physical server and the migration destination volume, depending on the number of ports of the physical server 10 and the number of ports of the storage apparatus 100; and records as many as the number of defined paths are created in the volume attachment design table 550.

In step 701d, the migration controller 515 obtains the configuration information of the Fibre Channel switches 55 and 65 by using the network manager 554 and checks if a path for external connection can be configured over the SAN and the configuration designated in the volume attachment design table 550 can be configured. More specifically, the migration controller 515 refers to the zone configuration on the Fibre Channel and the storage domain configuration of the storage apparatuses and verifies that the external connection 700e between the storage apparatuses and physical connectivity when providing the storage resources from the migration destination storage apparatus 100 to the migration destination physical server 10 can be obtained, that this is not limited by the specification of each device, and that the relevant identifier is not a duplicate of other identifiers.

If the verification results are inappropriate, the migration controller 515 cancels the designation of the relevant virtual server for migration of the virtual server or changes the values designated by the administrator, thereby modifying the target mapping table 549 and the volume attachment design table 550.

In step 701e, the migration controller 515 presents the settings for migration to an operator based on the target mapping table 549 and the volume attachment design table 550. If the migration controller 515 obtains an approval of the administrator for the settings for migration, it proceeds to the next step 701f; and if the migration controller 515 fails to obtain the approval of the administrator for the settings for migration, it returns to step 701a and makes the settings again. Incidentally, if the approval of the administrator is obtained, migration of the virtual server, which is the migration target, to the physical server 20 other than the migration destination may be prohibited by means of the virtual server migration function of the virtualization program 14.

In step 701f, the migration controller 515 sets the volume mapping table 559, the storage domain management table 558, and the volume management table 557 through the storage manager 556 in accordance with the volume attachment design table 550. The storage manager 556 changes the configuration of the first storage apparatus 100 and the second storage apparatus 200 in accordance with the settings made by the migration controller 515 and applies the external connection function to the migration target volume.

Specifically speaking, the migration controller 515 connects the first storage apparatus 100 and the second storage apparatus 200 at the Fibre Channel interface 700e via the storage manager 556, sets the migration destination volume 700b as a virtual volume, maps the migration target volume 700b to the migration destination volume 700d, and connects the migration destination virtual server 700f to the migration destination volume 700d as described later, so that the migration destination virtual server 700f can access the migration target volume 700b by accessing the migration destination volume 700d.

If the storage manager 556 completes the setting for the external connection in step 701g, it issues a completion notice to the migration controller 515.

If it is necessary to further migrate the entity of the migration target volume from the second storage apparatus 200 to the first storage apparatus 100 after the external connection, the migration controller 515 creates a duplicate volume of the migration target volume 700d via the storage manager 556 by using an intra-apparatus copy function of the first storage apparatus 100; and when copying from the migration target volume 700b to the duplicate volume is completed, the duplicate volume may be set to a new migration destination volume as a primary volume. The migration control program can copy the migration target volume 700b to another real volume (new migration destination volume) of the first storage apparatus 100 via the migration destination volume 700d (virtual volume) by using an online migration function of the first storage apparatus 100 and/or the second storage apparatus 200 instead of the intra-apparatus copy function; and if this form is used, the volume can be migrated without stopping the volume. If the new migration destination volume is set, the external connection between the first storage apparatus 100 and the second storage apparatus is released and the connection between the virtual volume 703d and the migrated virtual volume 703g is released; and when this happens, a connection between the new migration destination volume and the virtual volume 703g is set.

In step 701h, the migration controller 515 cuts off the connection between all the migration source virtual servers 700a, which use the migration target volume 700b, and the virtual disks to which the relevant migration source servers are connected, by using the physical server manager 551 and deletes the virtual server 700a.

In step 701i, the migration controller 515 restores the virtual server 700f, which has the same identifier as the migration source virtual server 700a, in the migration destination physical server 10 by using the physical server manager 551. In step 701i, the identifier of the virtual server may be changed as described earlier. In this case, the physical server manager 551 registers the changed identifier again.

In step 701j, the migration controller 515 sets a path from the migration destination physical server 10 to the migration destination volume 700d in accordance with the information retained in the volume attachment design table by using the storage manager 556.

In step 701k, the migration controller 515 refers to the target mapping table 549 and restores the connection relationship 700h between the virtual disk 700g and the virtual server 700f by using the physical server manager 551.

If the path is set in step 701j, the migration destination physical server 10 can detect the migration destination volume 700d. At this stage, the virtual disk is not connected to the restored virtual server 700f and values are not entered to the virtual disk identifier 552d and its type 552e with respect to the virtual disk management table 552 of the migration destination physical server 10.

So, in step 701k, the migration controller 515 selects an appropriate virtual disk 700g from among the detected migration destination volume 700d and enters it in the virtual disk management table 552. In order to select an appropriate virtual disk 700g in this circumstance, virtual disk identifiers in the detected migration destination volume 700d may be examined and a virtual disk identifier that matches the virtual disk identifier 549d retained in the target mapping table 549 may be selected or a virtual disk identifier that matches the file name retained as the path on the file system 549e may be selected.

However, considering that regarding the path on the file system 549e, the location on the file system such as the drive letter might change before and after the migration, the migration controller 515 converts the path on the file system 549e into information equivalent to the disk drive location 550e retained by the volume attachment design table 550 and then executes processing for checking the file name (or the path on the file system). The change is reflected in the virtualization program 14 based on the identifier of the virtual disk, which is set to the virtual disk management table 552, and then the virtual server 700f becomes operable by using the virtual disk 700g.

The migration system provided by this embodiment can migrate a virtual server and a virtual disk to a different physical server and a different storage apparatus by utilizing the migration function of the storage apparatuses. Furthermore, the method for recreating the migration destination virtual server does not require the establishment of a large-capacity data transfer network (the communication path 90) between the migration source physical server and the migration destination physical server and can minimize changes of the Ethernet configuration caused by the migration. Furthermore, the administrator only has to designate the migration target virtual server and the migration destination physical server and other workload for the setting operation to use the functions of the storage apparatuses will not be produced.

Furthermore, according to this embodiment, the second storage apparatus can provide the migration source volume to the destination physical server, to which the virtual server is to be designated, by using the external connection between the first storage apparatus and the second storage apparatus without waiting for the completion of copying from the migration target volume to the migration destination volume.

(Embodiment 2)

In the second embodiment, a system for migrating a virtual server and its virtual disk without stopping by having the virtual server migration function provided by the virtualization program cooperate with the external connection function provided by the storage apparatus. This embodiment utilizes a virtual server nonstop migration function by the virtualization program. This migration function enables migration of a virtual server without stopping it only by transferring the status of the virtual server, setting information, and data in a memory over the network when the virtualization programs of the migration source physical server and the migration destination physical server share the volume which stores a virtual disk.

It is necessary to transfer and assign the status of applications, which are being executed on the virtual server, and data in use in the memory in order to migrate the virtual server without stopping to a different physical server; and a mechanism for making the virtualization programs in cooperation with each other is required.

Furthermore, this migration function provided by the virtualization program is used often together with a load distribution function for a plurality of physical servers and a high reliability function (fail-over function) and it is unacceptable to wait for virtual disk migration time, so that the configuration to share a volume storing a virtual disk(s) is employed.

The physical configuration and the logical configuration of this embodiment are the same as those of Embodiment 1 shown in FIG. 1. However, the shared volume service 14b shown in FIG. 14 always operates in the virtualization program 14 of the second physical server 20, which is the migration source, and the first physical server 10, which is the migration destination, in order to configure a shared volume. Furthermore, physical servers which share the same volume are treated as one group and identified with the volume sharing group name 552c in the virtual disk management table 552 (see FIG. 6).

A mechanism that guarantees consistency of data retained in a volume is necessary in order to share the volume. This is because when data is written disorderly from the plurality of physical servers, a storage area used by a certain physical server may be overwritten by another physical server.

So, the shared volume service 14b in the plurality of physical servers belonging to the same shared volume group performs exclusive control in a file system layer and a logical volume layer in the storage stack 14a and guarantees the consistency of data stored in the volume. For example, there is a mechanism that exclusively provides an area in the file system layer, which may be accessed by each physical server or each virtual server, or reserves and locks a volume in the logical volume layer or a device driver layer in order for one physical server to temporarily occupy the volume. Therefore, in this embodiment, the shared volume service 14b sends and receives control information about the reservation of storage areas by using, for example, the communication path 90. Alternatively, the storage apparatus has a mechanism for synchronizing lock information (for example, a reservation defined by the SCSI standards) for the volume between the plurality of physical server devices.

Figure 18:
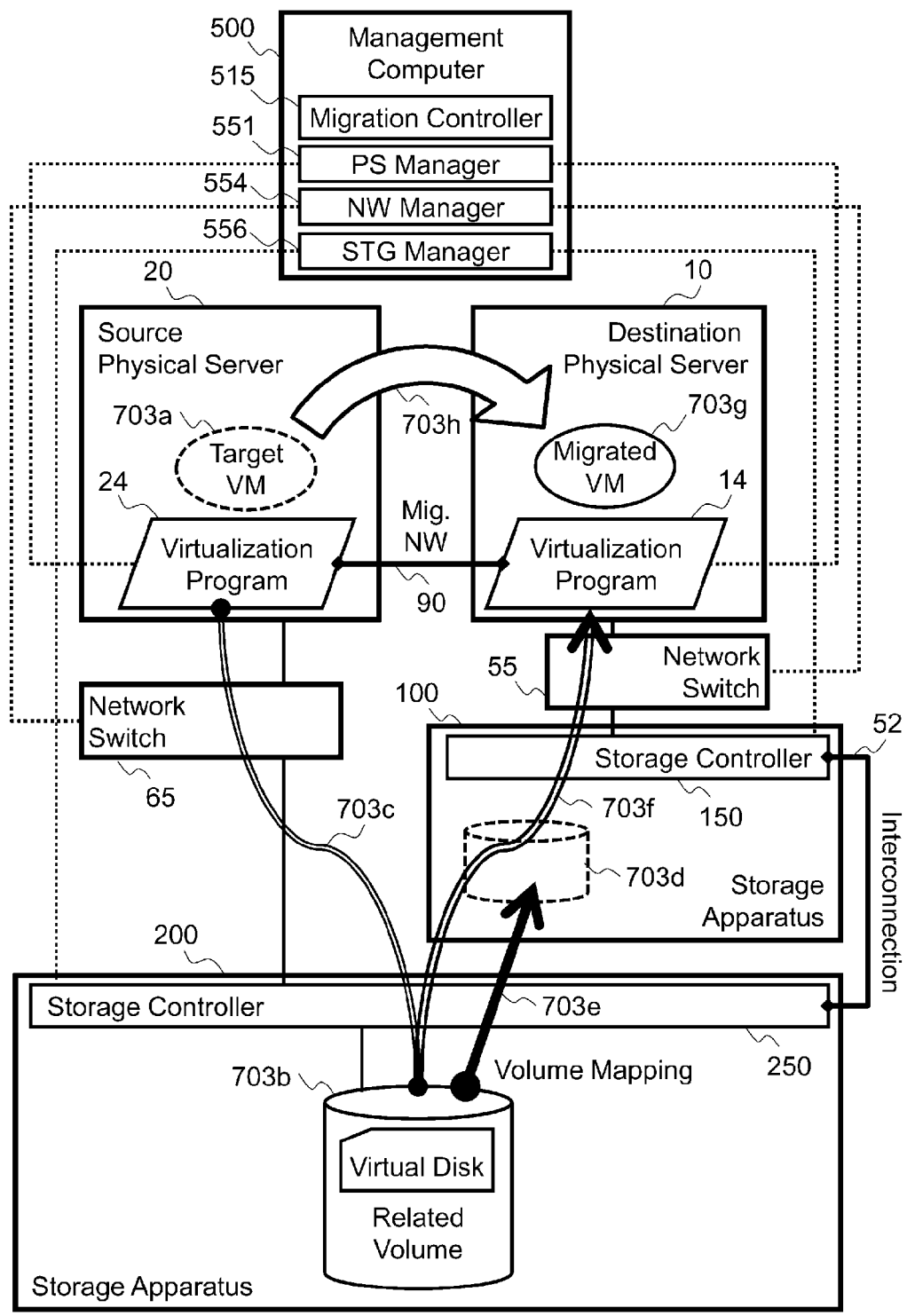
FIG. 18 is a block diagram of a computer system for migrating a virtual server and a virtual disk according to a second embodiment of the present invention.

FIG. 18 shows a conceptual diagram of the method for migrating a virtual server and a virtual disk, which is provided in this embodiment. It is assumed that in a pre-migration state, a virtual server 703a in the second physical server 20 uses a virtual disk which is stored in a volume 703b in the second storage apparatus 200. When the virtual server 703a is designated as a migration target in this embodiment, the migration controller 515 obtains the configuration information from the management program and specifies the volume 703b. Subsequently, the migration controller 515 makes the external connection setting 700e so as to associate the volume 703b with a virtual volume 703d in the first storage apparatus 100.

Furthermore, the migration controller 515 makes the volume 703d accessible from the first physical server 10, so that it thereby makes the same volume 703b accessible from both the first physical server 10 and the second physical server 20 and sets this volume 703b as a shared volume. Then, a virtual server nonstop migration function 703h is used between the virtualization programs 14 and 24 and the virtual server 703a in the second physical server 20 is migrated to the first physical server 10.

Since the connection relationship between the virtual servers and the virtual disks is managed and maintained by the virtual server nonstop migration function of the virtualization program in this embodiment, the procedure for reconstructing this connection relationship like step 701k in Embodiment 1 is not necessary.

When the migration controller 515 finishes migrating all virtual servers which store virtual disks in the volume 703b, the shared volume setting is canceled. If necessary, the migration controller 515 may execute the procedure for migrating data retained by the migration source volume 703b to another volume in the first storage apparatus 100 by using the online volume migration function of the first storage apparatus 100.

If the virtual server migration function 703h requires a function locking volumes in the storage apparatus in order to perform exclusive control of the shared volume, the locked state of the migration source volume 703b may be obtained and synchronized with the locked state of the virtual volume 703d in the first storage apparatus 100. For example, the migration controller 515 manages the locked state of the migration source volume 703b and the virtual volume 703d by using the storage manager 556 and further synchronizes it with lock control of the shared volume service of the virtualization programs 24 and 14 by using the physical server manager 551. Furthermore, when the migration controller 515 sets the external connection 703e, the locked state of the volume 703b and the volume 703d may be matched in the storage apparatus 100.

Furthermore, when the shared volume is configured, it should be recognized, in the environment where volumes are accessed by a plurality of physical servers via separate paths, that the volumes accessed by the respective physical servers are actually the same volume. The identity of the volumes means that the content such as attributes retained by each volume is essentially the same; and it is necessary to check the content as an advance requirement to configure the shared volume.

However, generally, processing for mounting volumes requires high cost, so that an identification method executed by the migration controller 515 for reading the entire content of the volumes and comparing the content is not realistic. Therefore, there are the following two approaches.

One approach is to write the same unique identification information to a plurality of volumes. As a result, even if a pair of volumes which are mapped by the external connection (for example, the volumes 703b and 703d) exist in separate storage apparatuses, the physical server recognizes that they are the same volume because they have the same identification information.

Another approach is to use a volume-specific device identifier (a volume-specific identifier included in a SCSI Inquiry response) used by the physical server to identify a volume.

Since the volume-specific device identifier is unique with respect to all volumes, it corresponds to the content of the relevant volume on a one-to-one basis. The volumes which are mutually mapped by the external connection (for example, the volumes 703b and 703d) and constitute a pair have different device identifiers, so that these volumes are not recognized as the same volume. Accordingly, when the mapping 703e is performed as a requirement to configure the shared volume in the volume mounted system that requires the relevant volumes to have the same device identifier, the procedure for making the virtual volume 703d take over the identifier of the migration source volume 703b is added to the migration procedure. The identifier takeover will be explained later in Embodiment 3.

Furthermore, if both the migration source storage apparatus and the migration destination storage apparatus are accessed during the migration time because the shared volume is configured via the different storage apparatuses, there is a possibility that data inconsistency might occur because each storage apparatus has a cache. The cache is a mechanism for temporarily storing data in a high-speed storage device (cache memory) and enhancing response performance of the physical server to respond to read/write access before the storage apparatus updates the content of the volume.

When the virtual server accesses the migration target volume from the second storage apparatus 200, the access goes through the cache in one step; and if the access is made from the first storage apparatus 100, the access goes through the caches in two steps because of the external connection function 703f. Since the cache is independent for each storage apparatus, data cached in the storage apparatus 200 is recorded in the shared volume 703b asynchronously with recording of data, which was cached in the storage apparatus 100, in the shared volume 703b through the external connection and, therefore, there is a possibility that inconsistency may occur in the data of the shared volume 703b. Therefore, when migrating the virtual server, the cache of the apparatus which has the external connection function (the storage apparatus 100 in this embodiment) is invalidated.

Figure 19:
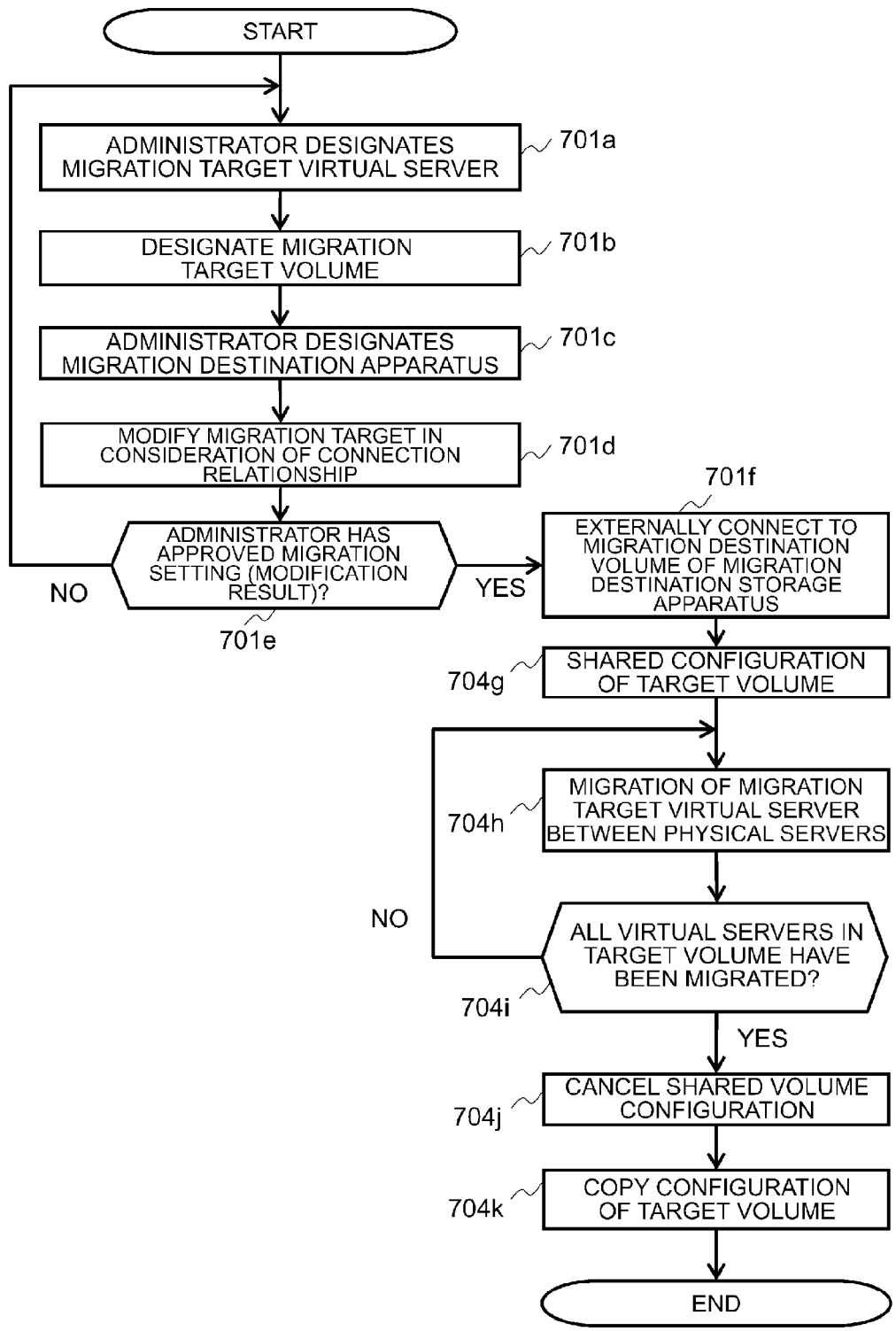
FIG. 19 is a processing flow diagram of the computer system in FIG. 18.

The detailed procedure for this will be explained with reference to a processing flow diagram shown in FIG. 19. Processing from step 701a to step 701f is the same as the processing in Embodiment 1. However, step 701b may include the procedure executed by the migration controller 515 for verifying whether the shared volume service 14b is validated in both the virtualization programs 24 and 14 and whether the volume can be shared, by using the physical server manager 551.

If the external connection setting is completed in step 704g, the storage manager 556 issues a setting completion notice to the migration controller 515 and sets a path from the physical server 10 to the mapping destination virtual volume 703d. The migration controller 515 validates the shared volume service 14d, if necessary, by using the physical server manager 551 and constitutes the volume 703b as the shared volume.

In step 704h, the migration controller 515 migrates the virtual server 703a, which is defined in the target mapping table 549, to the first physical server 10 by using the physical server manager 551.

In step 704i, the migration controller 515 compares the virtual server identifier 549c of the target mapping table 549 with the virtual server identifier 553h in the migration source physical server 20, which can be obtained from the physical server information 553 through the physical server manager 551, and then judges whether all the virtual servers 703a which use the migration target volume 703b have been migrated or not. If the migration target virtual server 703a remains in the migration source physical server 20, the migration controller 515 returns to step 704h and repeats the virtual server nonstop migration processing.

In step 704j, the migration controller 515 cancels the volume shared configuration in the migration source physical server 20 by using the physical server manager 551 and blocks access from the migration source physical server 20 to the volume 703b. Step 704j may include the procedure executed by the storage manager 556 for cancelling the path setting or the procedure executed by the network manager 554 for changing the zone configuration and prohibiting access.

In step 704k, the migration controller 515 has the storage manager 556 migrate the content of the volume 703b to another volume in the first storage apparatus 100 by means of the online volume migration function as described earlier.

The configuration information management system according to this embodiment selectively and automatically applies the functions of the storage apparatus to a volume used by a virtual server designated as a migration target. Therefore, this system can make use of the external connection function and the online volume migration function of the storage apparatus in cooperation with the virtual server nonstop migration function of the virtualization program and migrate the virtual server without stopping it. Furthermore, it is unnecessary to introduce multi-path software which is explained in Embodiment 3.

(Embodiment 3)

The third embodiment provides a method for migrating a virtual server and its virtual disk by using a volume nonstop migration function of the storage apparatus. The volume nonstop migration function of the storage apparatus is a function that migrates a migration target volume to a different storage apparatus without stopping access by the virtual server to the volume by means of switching of a path to the externally connected volume and takeover of the volume identifier.

The external connection function is the technique for, for example, associating a volume in the second storage apparatus 200 as if it were a virtual volume in the first storage apparatus 100. So, even if the content retained by the volumes is the same, the identifiers (the device identifiers included in a SCSI Inquiry response) of the volumes recognized by the physical server are different.

Therefore, a volume can be migrated between the storage apparatuses without having the physical server recognize the volume change by making the virtual volume take over the identifier of the volume when the external connection is set. Furthermore, the migration controller 515 needs to switch the storage-apparatus-side port for accessing the volume without stopping access from the physical server to the volume 703b, so that it executes processing for having the switched port take over a pre-switching port name and having a multi-path driver dynamically switch the access path.

The migration controller 515 uses, for example, NPIV (N_Port ID Virtualization) capable of assigning a plurality of port identifiers to a port in order to assign port identification information.

Figure 20:
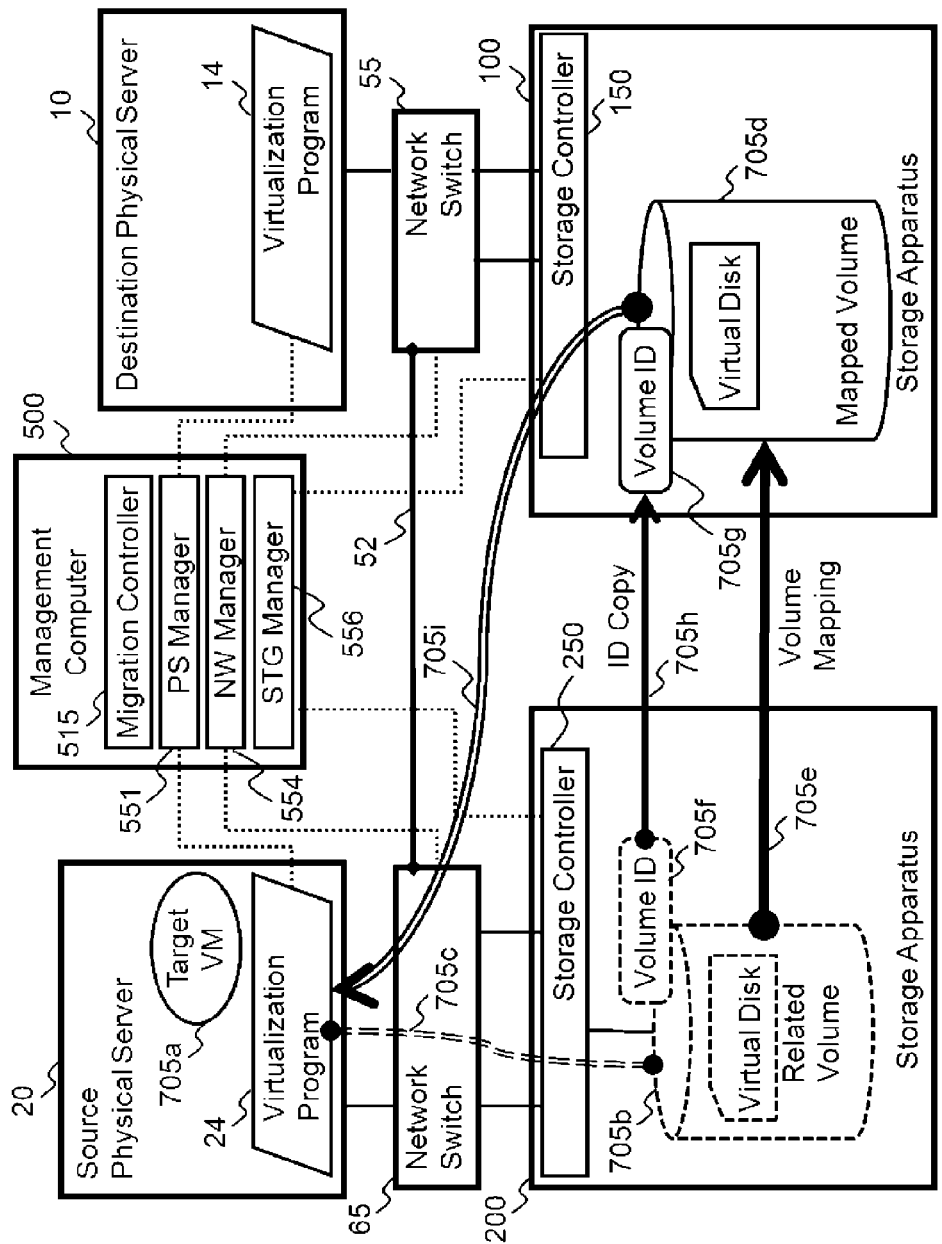
FIG. 20 is a block diagram of a computer system for migrating a virtual server and a virtual disk according to a third embodiment of the present invention.

FIG. 20 shows the concept of the migration method according to this embodiment. The difference between this embodiment and the aforementioned first and second embodiments is that a communication path 52 is established between a migration source network and a migration destination network in order to mutually connect these networks. This is because it becomes necessary for the first physical server 10 to connect to the second storage apparatus 200 or for the second physical server 20 to connect to the first storage apparatus 100.

When a virtual server 705a is designated as the migration target, the migration controller 515 in the management computer 500 specifies a volume 705b in the second storage apparatus 200 used by the virtual server 705a.

The migration controller 515 sets the external connection 705e for connecting the volume 705b to a volume 705d in the first storage apparatus 100, which is the migration destination, by using the storage manager 556. Furthermore, the volume identifier 705f is assigned to the volume 705d (705g).

When a series of processing following the external connection is completed, the migration controller 515 switches access from a path 705c to the migration source storage apparatus 200 to a path 705i to the migration destination storage apparatus 100 in a multi-path driver layer in the storage stack of the virtualization program 24. Then, access to the volume 705b can continue without letting the file system layer of the virtualization program 24 and the virtual server 705a detect the change of the access target volume.

However, if the cache in the storage controller 150 for the migration source storage apparatus 100 is valid, there is a possibility as in Embodiment 2 that inconsistency of data retained by the volume may occur depending on the timing to apply data in the cache to the migration target volume 705b. Accordingly, the migration controller 515 needs to avoid the inconsistency of the caches by invalidating the cache in the first storage apparatus 100.

Figure 21:
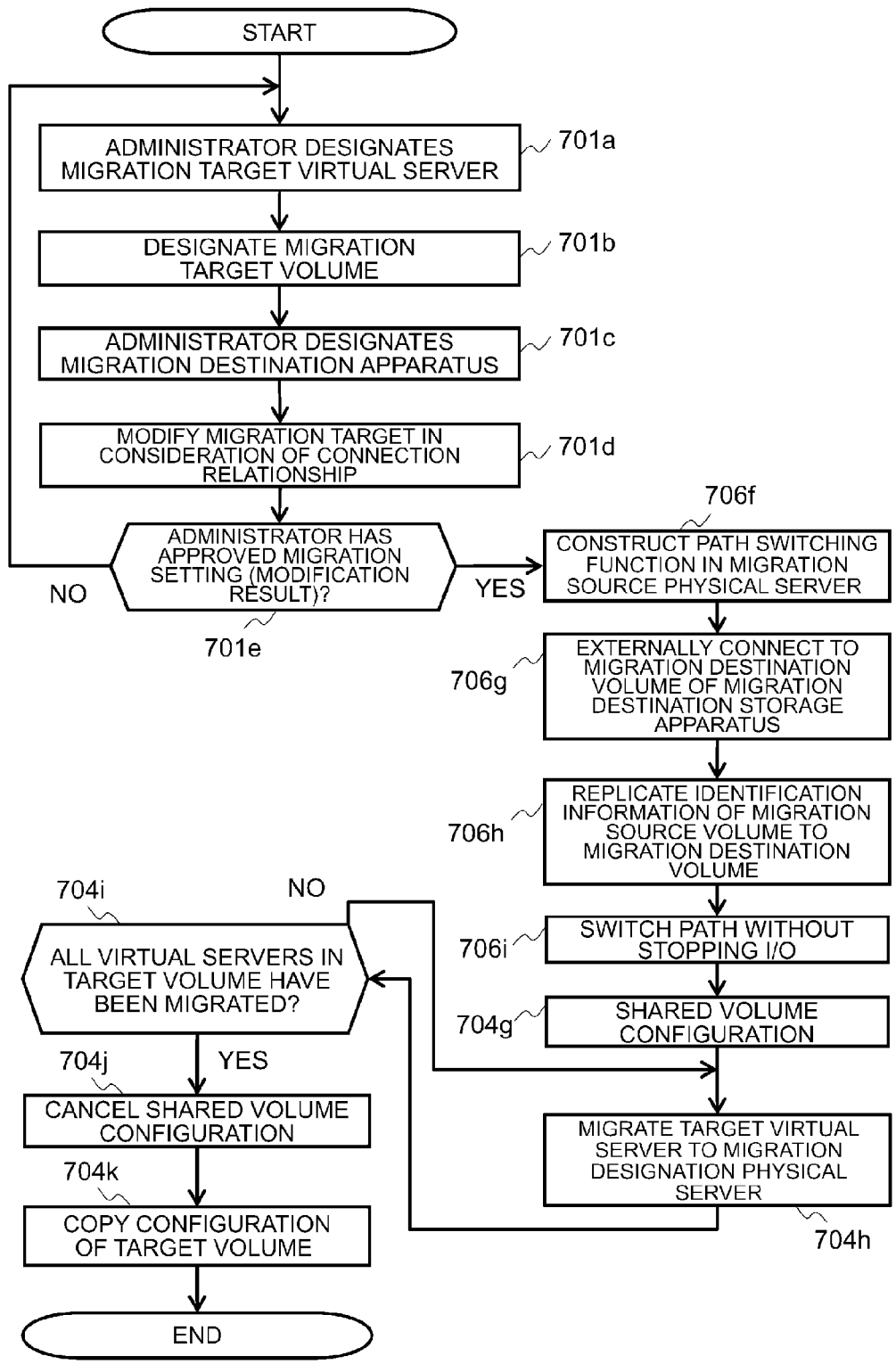
FIG. 21 is a processing flow diagram of the computer system in FIG. 20.

Since the volume 705b becomes accessible from the migration destination storage apparatus 100 as a result of this volume migration processing, the migration controller 515 migrates the migration target virtual server 705a to the first physical server 100 by, for example, using the virtual server migration function provided by the virtualization programs 24 and 14. When this happens, the volume 705d is configured as a shared volume. This virtual server migration method is the same as the method described in the second embodiment. The detailed migration procedure will be explained with reference to a processing flow diagram shown in FIG. 21. Processing from step 701a to step 701e is the same as the processing in Embodiment 1.

However, step 701b may include the procedure executed by the migration controller 515 for verifying whether the shared volume service 14b is validated in both the virtualization programs 24 and 14 and whether the volume can be shared, by using the physical server manager 551. Furthermore, step 701b may also include the procedure for checking whether a path switching function realized by the multi-path driver can be used or not.

Step 706f introduces the path switching function to the migration source physical server 20. If the multi-path driver capable of controlling a plurality of paths has already been introduced to the migration source physical server 20 or the path switching function of the OS is validated, this step may be omitted. However, since an embodiment that requires reactivation of the physical server for introduction of an alternate path is common, the reactivation of the physical server has to be completed before starting this step.

In step 706g, the migration controller 515 sets the volume mapping table 559 via the storage manager 556 in accordance with the volume attachment design table 550. The storage manager 556 changes the configuration of the first storage apparatus 100 and the second storage apparatus 200 in accordance with the volume mapping table 559 and applies the external connection function to the migration target volume.

If the external connection setting is completed in step 706h, the storage manager 556 issues a setting completion notice to the migration controller 515 and copies the identification information 705f of the migration source volume 705b to the migration destination volume 705d (706h).

In step 706i, the migration controller 515 makes the port used by the migration destination volume 705d take over the port name used by the migration source volume 705b for connection to the physical server 20 by using the storage manager 556. Furthermore, the path 705i for connection to the migration destination virtual volume 705d is defined with respect to the port of the migration source physical server 20.

Next, the migration controller 515 adds the newly set path to the alternate path configured in step 706f by using the physical server manager 551. On the other hand, the migration controller 515 deletes the existing path 705c to the migration source volume 705b at the stage where the connection is established. As a result, the migration controller 515 changes the access target from the migration source storage apparatus 200 to the migration destination storage apparatus 100 without stopping access from the migration target virtual server 705a to the volume 705b. The following processing from step 704g to 704k is the same as the virtual server nonstop migration processing by using the function of the virtualization programs 24 and 14 in the second embodiment.

The migration procedure described in this embodiment firstly performs nonstop migration of the volume and then uses the virtual server nonstop migration function of the virtualization programs. However, even if this procedure is performed in reverse order, there will be no difference in the required function in this embodiment and the virtual server and the virtual disk will be migrated in the same manner. So, the migration procedure is not necessarily limited to the procedure described above.

Regarding the migration method provided by this embodiment, it is unnecessary to configure a shared volume through the different storage apparatuses and disadvantages can be minimized to the degree that performance degradation caused by invalidation of the cache on one side in Embodiment 2 would occur only at the time of switching.

(Embodiment 4)

The fourth embodiment provides a method for migrating a virtual server and its virtual disk by performing the virtual disk nonstop migration function of the virtualization program in cooperation with the external connection function of the storage apparatus. In this embodiment, the takeover of the volume identifier as described in Embodiment 3 is not performed. Some virtualization program has a function that migrates the virtual disk of the file format to another volume without stopping access from the virtual server to the relevant volume. If the external connection function is used, an identifier different from that of a mapping source (migration source) volume is assigned to a mapping destination (migration destination) volume. Accordingly, the physical server identifies these volumes, which are externally connected, to be separate volumes even though their content is the same. So, the migration controller 515 migrates the virtual disk in the volume to the volumes which are mapped by the external connection and thereby constitute a pair, by using the virtual disk nonstop migration function of the virtualization program.

Figure 22:
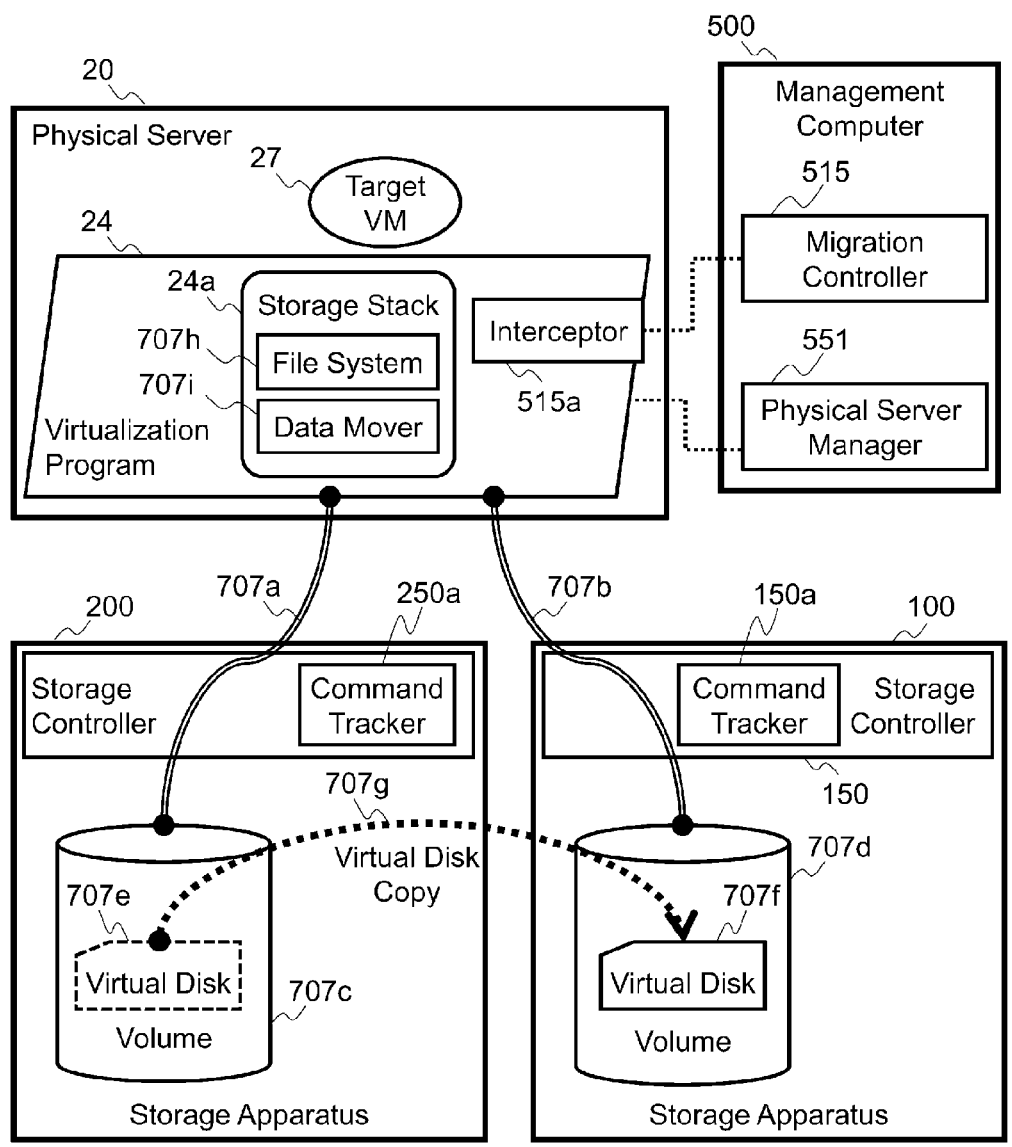
FIG. 22 is a first block diagram of a computer system for migrating a virtual server and a virtual disk according to a fourth embodiment of the present invention.

The migration method system provided by the fourth embodiment does not actually perform copying, that is, the copy operation for nonstop migration of the virtual disk between the volumes, and substitutes it with the external connection function of the storage apparatus. Upon implementing the substitution processing, an inceptor 515a and command trackers (150a and 250a), which are characteristic components of this embodiment, are added to the virtualization program 24 and the storage controller 250 as shown in FIG. 22. The command tracker 150a, 250a realizes a function that detects and interprets issuance of a request command from the physical server to the volume and responds to the command as explained later.

Now, normal operation of the virtual disk nonstop migration function provided by the virtualization program, that is, the operation in a state where the inceptor 515a or the command trackers do not exist will be explained. The migration controller 515 has the virtualization program 24 recognize a volume different from a volume storing the virtual disk and makes it available. Migration of the virtual disk is started when the physical server manager 551 requests the virtualization program 24 to designate a virtual disk of a certain virtual server and migrate it to another volume.

The location of the virtual disk in the volume is managed by recognizing which record address (segment number) of which volume in a file system 707h the relevant location corresponds to. The virtualization program 24 refers to the record address of the relevant virtual disk managed by the file system 707h and generates a command for performing the virtual disk migration processing together with the designation of the record address of the migration destination. This command is delivered to a component called a data mover 707i in charge of copy processing. The data mover 707i issues a SCSI command to the storage apparatus and requests the storage apparatus to copy a data area, which retains the virtual disk, from the migration source volume to the migration destination volume.

The migration source storage controller 250 for the storage apparatus receives the SCSI command of the copy request from the data mover 707i and executes copy processing in cooperation with the migration destination storage controller 150. If necessary, the progress of the copy processing is sequentially reported from the storage controllers 150 and 250 to the data mover 707i. When copying is completed, the migration destination storage controller 150 sends a response to that effect to the data mover 707i. Having received the copy completion response, the data mover 707i changes the record address of the virtual disk managed by the file system 707h. As a result, the virtual server comes to operate by using the virtual disk in the migration destination volume. The above-described operation is normal migration operation performed when using the virtual disk nonstop migration function.

Figure 23:
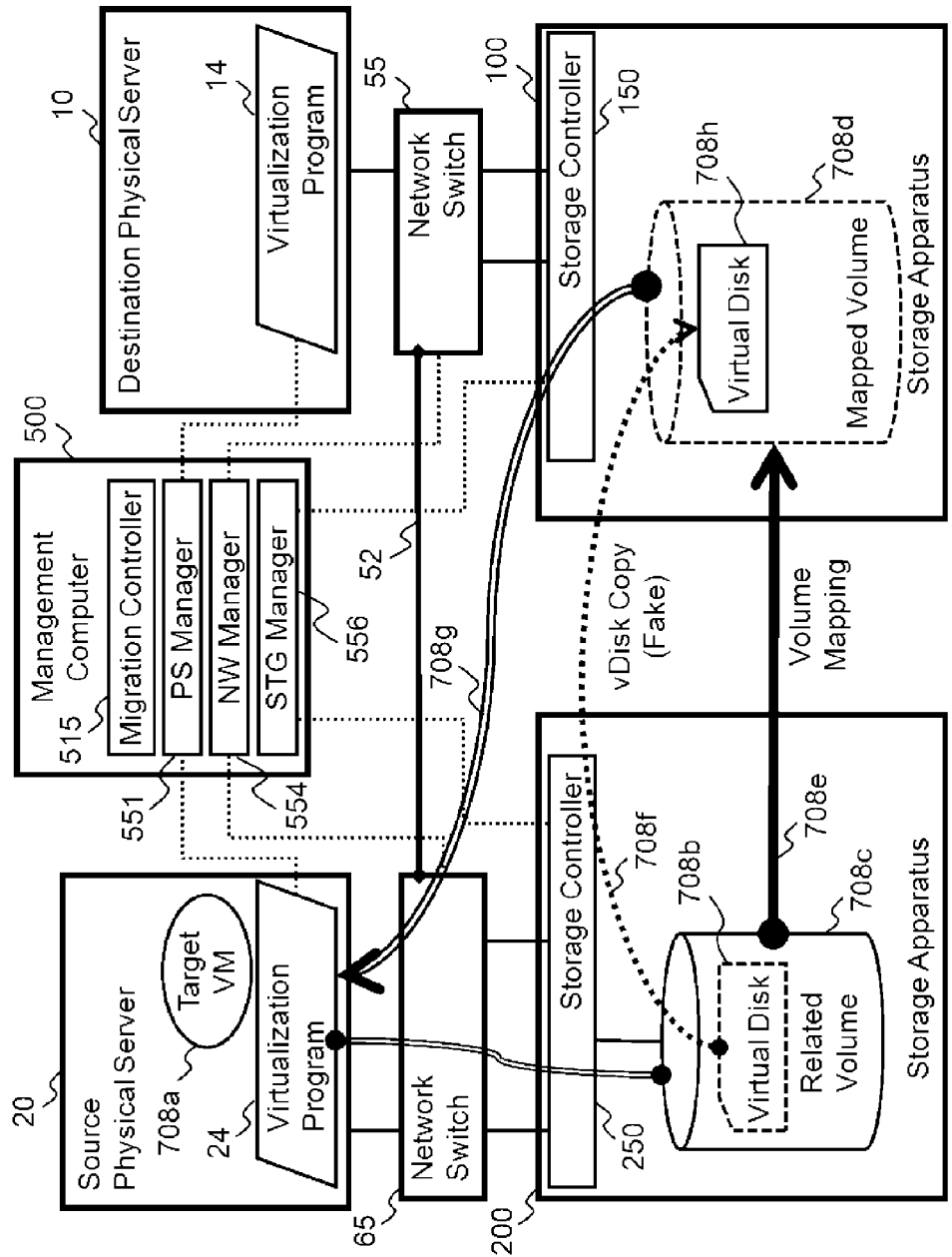
FIG. 23 is a second block diagram of a computer system for migrating a virtual server and a virtual disk according to a fourth embodiment of the present invention.

FIG. 23 shows the concept of this embodiment. Referring to FIG. 23, a virtual disk 708b used by a virtual server 708a in the second physical server 20 is stored in a volume 708c in the second storage apparatus 200 before migration. The difference between this embodiment and the aforementioned first and second embodiments is that the communication path 52 is set for the purpose of mutually connecting a migration source network and a migration destination network in this embodiment. This is because it becomes necessary for the second physical server 20 to connect to the first storage apparatus 100.

When the virtual server 708a is designated as the migration target and a volume 708d is designated as the migration destination volume, the volume 708c is firstly specified as the migration target and the volume 708c is mapped to the migration destination volume 708d by using the external connection function of the first storage apparatus 100 which is the migration destination.

Next, when the migration destination volume 708d is connected to the migration source physical server 20 by the storage manager 556, the identifies of these volumes are different, so that the virtualization program 24 recognizes the migration destination volume 708d as a volume different from the migration source volume 708c. However, when this happens, the inceptor 515a controlled by the migration controller 515 interferes with the file system recognized by the virtualization program 24 in the migration source physical server 20 and the existence of all virtual disks 708h in the volume 708d are concealed. As a result, when the volume 708d is added, it is recognized by the file system as a newly added empty volume which does not retain any virtual disk at all.

Incidentally, the inceptor 515a has a function controlling record addresses of files (virtual disks) retained/managed by the file system as described above. The file system manages the files as abstracted metadata (for example, file start addresses and record length) and uses the metadata, for example, when referring to the metadata at the time of reading or inquiring about an empty record address at the time of writing of new data. The inceptor 515a can create, delete, or rewrite the metadata. For example, it is possible to control the record addresses so as to delete the metadata of an actually recorded file and make it look like an empty file, or to reply a specific address as an empty area and designate a new write location.

Furthermore, the physical server manager 551 requests the virtualization program 24 in the second physical server 20 to copy the virtual disk 708b to the volume 708d. When copying this virtual disk, the SCSI command issued from the second physical server 20 is trapped by the command tracker 250a of the migration source. So, actual copying 708f is not performed and the command tracker 150a of the migration destination immediately sends a response of the completion of the copy processing to the virtualization program 24. If the command tracker 250a is required for judgment of a condition to determine whether the trap operation should be performed or not, the procedure executed by the migration destination storage apparatus 100 for detecting that the migration destination volume and the migration source volume are a pair of externally connected volumes may be further performed before the command tracker 250a executes copying from the second storage apparatus 200 to the first storage apparatus 100.

The migration destination volume 708d is initially mounted as an empty volume in the physical server 20. When data is created or moved, the data mover 707i in the virtualization program 24 selects a record address of the data from the blank area where nothing is recorded. Since the virtualization program 24 is not aware that the volume 708c and the volume 708d have the same content, there is a possibility that the virtualization program 24 may secure a different address as a copy destination regardless of the address where the virtual disk 708b exists. In order to avoid this, the inceptor 515a interferes with the procedure executed by the data mover 707i in a lower layer of the logical volume manager for designating a copy destination address and controls the addresses so that the copy destination address of the virtual disk in the volume 708d becomes the same as a copy source address in the volume 708c without fail. As a result, data arrangement of the volume 708c always becomes the same as that of the volume 708d.

Figure 24:
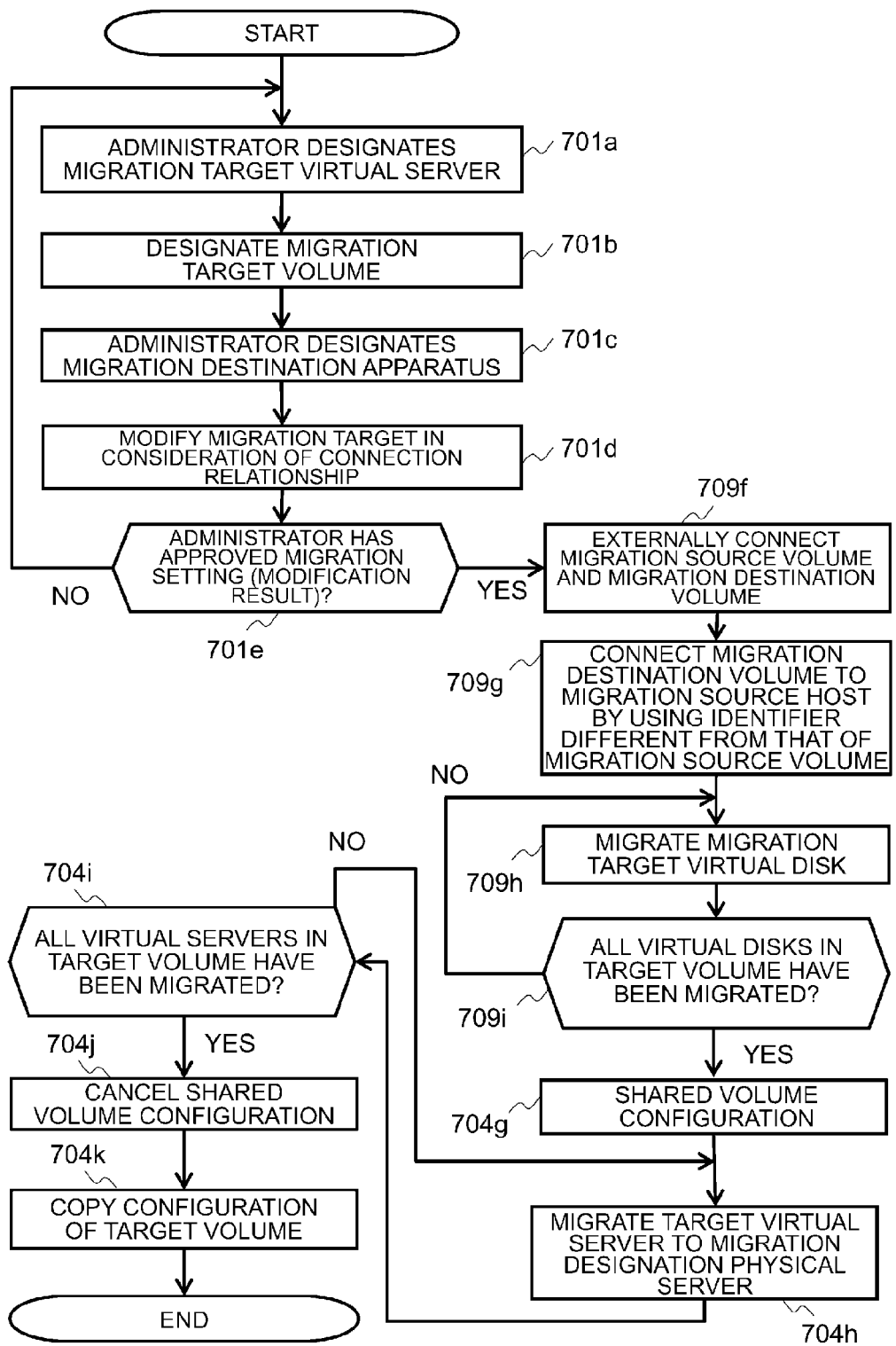
FIG. 24 shows a processing flow diagram according to the fourth embodiment of the present invention.

When the virtualization program 24 receives a completion notice of the virtual disk migration 708f, the record address of the virtual disk has been changed as the normal procedure by the data mover 707i and the virtual disk 708b is concealed and the address of the virtual disk 708h is disclosed to the file system. As a result of the above-described series of operation, the virtualization program 24 recognizes as if the virtual disk has been migrated, without actually copying the virtual disk. The detailed migration procedure will be explained with reference to a processing flow diagram shown in FIG. 24.

Processing from step 701a to step 701e is the same as the processing in Embodiment 3. In step 709f, the migration controller 515 sets the volume mapping table 559 through the storage manager 556 in accordance with the volume attachment design table 550. The storage manager 556 changes the configuration of the first storage apparatus 100 and the second storage apparatus 200 in accordance with the volume mapping table 559 and applies the external connection function to the migration target volume. However, if necessary, step 709f may include the procedure executed by the migration controller 515 for introducing the inceptor 515a to the migration source physical server 20 and the procedure for commanding the migration source storage apparatus 200 to validate the command tracker 250a.

In step 709g, the storage manager 556 defines a path 708g for connecting the migration destination volume 708d to the physical server 20. Next, the migration controller 515 uses and makes the physical server manager 551 detect the newly connected volume 708d from the virtualization program 24. When this happens, the virtualization program 24 recognizes the migration destination volume 708d as a volume different from the migration source volume 708c because their volume-specific device identifiers are different. Furthermore, when this happens, the inceptor 515a conceals the existence of virtual disks in the migration destination volume 708d, so that the migration destination volume 708d is recognized as an empty volume. As a result, the system enters a state where the virtual disk nonstop migration function of the virtualization program 24 can be applied to virtual disks stored in the migration source volume 708c.

In step 709h, the migration controller 515 refers to the target mapping table 549 and the volume attachment design table 550 and uses and makes the physical server manager 551 issue a request to migrate a virtual disk in the migration target volume 708c. The virtual disk to be migrated can be specified with the virtual disk identifier 549d in the target mapping table 549. In this circumstance, the virtual disk is migrated to the migration destination volume 708*d* by the aforementioned method without actually performing the copy operation.

In step 709*i*, the migration controller 515 refers to the migration target volume 708*c* and judges whether any migration target virtual disk remains, by using the physical server manager 551. If no migration target virtual disk remains, the migration controller 515 proceeds to the next step; and if any migration target virtual disk remains, the migration controller 515 returns to the previous step 709*h* and migrates the virtual disk repetitively.

In subsequent steps, the migration destination volume 708*d* is used to configure a shared volume and all the virtual servers 708*a* on the migration source physical server 20 are migrated to the migration destination physical server 10; and the subsequent steps are the same as steps 704*g* to step 704*k* in Embodiment 3.

The target volume can be migrated without stopping by the migration method provided by this embodiment even when the function enabling the migration destination volume to take over the identification information from the migration source volume is not provided.

Incidentally, the volume migration means a state where the migration destination physical server of the virtual server can access the virtual disk of the migration target volume; and includes, for example, a case where the migration target volume is migrated by setting a real volume of the migration destination storage apparatus as the migration destination volume, and also includes a state where the migration target volume is mapped to a virtual volume of the migration destination storage apparatus.

REFERENCE SIGNS LIST

10 First physical server
11 CPU
12 Memory
13 Operating system
14 Virtualization program
15 Fibre Channel interface
16 Ethernet interface
17 Virtual server
20 Second physical server
50 First storage area network
51 Second storage area network
90 Management network
100 First storage apparatus
150 First storage controller
160 Response program
161 Redirect program
162 Volume control program
166 Storage management provider
200 Second storage apparatus
250 Second storage controller
500 Management computer
515 Migration controller
549 Target mapping table
550 Volume attachment design table
551 Physical server manager
554 Network manager
556 Storage manager

The invention claimed is:

1. A computer system comprising:
a first system having a first physical server, a first storage apparatus, and a first network configured to connect the first physical server and the first storage apparatus;
a second system having a second physical server, a second storage apparatus, and a second network configured to connect the second physical server and the second storage apparatus;
a third network configured to connect the first storage apparatus and the second storage apparatus; and
a management computer configured to manage the first system and the second system;
wherein the management computer is configured to, when the management computer accepts information for designating a virtual server to be migrated from the second physical server to the first physical server:
store a storage area used by the virtual server and specifies a migration target volume existing in the second storage apparatus;
detect dependency of the virtual server and the storage area and add, in a mapping table, a record of the virtual server and the migration target volume indicating that the virtual server and the migration target volume should be migrated together;
set a migration destination volume, which is a migration destination of the migration target volume, in the first storage apparatus by associating the migration destination volume with the migration target volume by means of a cooperative function between the second storages apparatus and the first storage apparatus;
specify a connection relationship between the virtual server and the storage area stored in the migration target volume, wherein the connection relationship is based on information collected from the first physical server, the first storage apparatus, the first network, the second physical server, the second storage apparatus, the second network, and the third network;
set the connection relationship to the migration destination volume when migrating the virtual server from the second physical server to the first physical server; and
set a temporary path between the first storage apparatus and second storage apparatus when migrating the virtual server from the second physical server to the first physical server, wherein the temporary path is in the third network, and
wherein the management computer is configured to, based on the connection relationship:
connect the first storage apparatus and the second storage apparatus via an external connection;
set a virtual volume as the migration destination volume in the first storage apparatus;
map the migration target volume to the migration destination volume; and
make the virtual server of the first physical server access the migration target volume via the migration destination volume and the external connection.

2. The computer system according to claim 1, wherein the management computer includes:
a first management program for managing configuration information of each of the first physical server and the second physical server; and
a second management program for managing configuration information of each of the first storage apparatus and the second storage apparatus; and
wherein the management computer is configured to obtain identification information of the migration target volume by checking first configuration information obtained by the first management program from the second physical server against second configuration information obtained by the second management program from the second storage apparatus.

3. The computer system according to claim 2, wherein the first configuration information has location information of the migration target volume when the second physical server connects to the migration target volume;
  wherein the location information has information about a port of the second physical server and a LUN for relating the port to the migration target volume;
  wherein the second configuration information has domain information for making the second physical server capable of accessing the second storage apparatus;
  wherein the domain information has the port information and the LUN; and
  wherein the management computer obtains identification information of the migration target volume by checking the port information and the LUN of the first configuration information against the port information and the LUN of the second configuration information.

4. The computer system according to claim 1, wherein the first storage apparatus and the second storage apparatus are connected via a Fibre Channel interface; and
  wherein the management computer is configured to:
  set a virtual volume as the migration destination volume to the second storage apparatus;
  map the migration target volume to the migration destination volume;
  cut off a connection between the virtual server of the second physical server and the migration target volume;
  set a path from the first physical server to the migration destination volume;
  connect the storage area to the virtual server of the first physical server so as to establish the connection relationship with the migration destination volume; and
  make the virtual server of the first physical server access the migration destination volume, thereby making the storage area of the migration target volume accessible.

5. The computer system according to claim 4, wherein the management computer is configured to create the virtual server of the second physical volume in the first physical server.

6. The computer system according to claim 4, wherein the management computer is configured to:
  sets another volume, which is different from the migration destination volume, to the first storage apparatus;
  copy the migration destination volume to the other volume by means of a copy function of the first storage apparatus; and
  connect the virtual server of the first physical server to the other volume.

7. The computer system according to claim 4, wherein the first physical server has a first virtualization program for virtualizing a server;
  wherein the second physical server has a second virtualization program for virtualizing a server; and
  wherein the management computer is configured to:
  have the first virtualization program and the second virtualization program share the migration target volume;
  migrate the virtual server from the second physical server to the first physical server without stopping;
  cancel the sharing of the migration target volume by the second virtualization program;
  block access from the second physical server to the migration target volume; and
  set the same identification information as that of the migration target volume to the migration destination volume.

8. The computer system according to claim 7, wherein when the second physical server accesses the migration target volume, the management computer is configured to make the first physical server also capable of accessing the migration target volume via the migration destination volume and invalidate cache data for the migration target volume of the first storage apparatus.

9. The computer system according to claim 4, wherein the management computer is configured to:
  have a port for the migration destination volume take over a port name used by the migration target volume to connect to the second physical server;
  copy the identification information of the migration target volume to the migration destination volume;
  set a path for connecting the second physical server to the migration destination volume as an alternate path for a path connecting the second physical server and the migration target volume;
  delete the path connecting the second physical server and the migration destination volume when the path connecting the second physical server to the migration destination volume is established; and
  migrate the virtual server from the second physical server to the first physical server without stopping.

10. The computer system according to claim 9, wherein the first physical server has a first virtualization program for virtualizing a server;
  wherein the second physical server has a second virtualization program for virtualizing a server; and
  wherein the management computer is configured to:
  have the first virtualization program and the second virtualization program share the migration destination volume;
  cancel the sharing of the migration destination volume by the second virtualization program; and
  block access from the second physical server to the migration destination volume.

11. The computer system according to claim 9, further comprising a communication path for a mutual connection between a network connecting the second physical server and the second storage apparatus and a network connecting the first physical server and the first storage apparatus.

12. The computer system according to claim 4, wherein the management computer sets a path for connecting the migration destination volume to the second physical server;
  wherein the management computer has a server virtualization program of the second physical server configured to recognize the migration destination volume; and when an identifier different from that of the migration target volume is set to the migration destination volume, the server virtualization program is configured to recognize the migration destination volume as a volume different from the migration target volume and further recognize the migration destination volume as an empty volume regarding which the existence of a storage area used by the virtual server of the migration destination volume is concealed; and
  wherein the management computer is configured to request the second physical server to copy the storage area of the migration target volume to the migration destination volume; and when this happens, the second storage apparatus is configured to return a response to the copy request to the second physical server without copying the storage area from the migration target volume to the migration destination volume and makes the second physical volume recognize as if the storage area were migrated from the migration target volume to the migration destination volume.

13. The new computer system according to claim 1, wherein when a second virtual server has a second storage area stored in the migration target volume, the management computer is configured to determine whether the second virtual server is a migration target.

14. The computer system according to claim 1, wherein when the virtual server is on a physical server, a second virtual server is on another physical server, the storage area for the virtual server is on a volume, a second storage area for the second virtual server is on the same volume, the storage area for the virtual server is migrated, and the second storage area for the second virtual server is not migrated.

15. The computer system according to claim 1, wherein when the storage area is in a snapshot of a parent volume, the snapshot and parent volume are migrated while preserving a snapshot relationship.

16. The computer system according to claim 1, wherein when the storage area is in a volume of a storage apparatus that is externally connected to another volume of another storage apparatus or that is copied between the storage apparatus and the another storage apparatus, the volume and the another volume are migrated while maintaining a relationship.

17. A virtual server migration control method for a computer system comprising:
   a first system having a first physical server, a first storage apparatus, and a first network configured to connect for the first physical server and the first storage apparatus;
   a second system having a second physical server, a second storage apparatus, and a second network configured to connect the second physical server and the second storage apparatus;
   a third network configured to connect the first storage apparatus and the second storage apparatus; and
   a management computer configured to manage the first system and the second system;
   the virtual server migration control method comprising:
   storing a storage area used by a virtual server and specifying a migration target volume;
   detecting dependency of the virtual server and the storage area and adding, in a mapping table, a record of the virtual server and the migration target volume indicating that the virtual server and the migration target volume should be migrated together;
   migrating, along with the virtual server from the second physical server to the first physical server, the storage area, which is used by the virtual server, from the second storage apparatus to the first storage apparatus by means of a cooperative function between the first storage apparatus and second storage apparatus;
   based on a connection relationship: connection the first storage apparatus and the second storage apparatus via an external connection, setting a virtual volume as the migration destination volume to the second storage apparatus; mapping the migration target volume to the migration destination volume; and making the virtual server of the first physical server access the migration target volume via the migration destination volume and the external connection,
   wherein based on a first management program configured to manage configuration information of each of the first physical server and the second physical server and a second management program configured to manage configuration information of each of the first storage apparatus and the second storage apparatus, the management computer:
   making the first management program obtain first configuration information from the second physical server, and makes the second management program obtain second configuration information from the second storage apparatus;
   obtaining location information of the migration target volume from the first configuration information when the second physical server connects to the migration target volume;
   obtaining domain information, which makes the second physical server capable of accessing the second storage apparatus, from the second configuration information; and
   obtaining identification information of the migration target volume by comparing the location information with the domain information.

18. The virtual server migration control method for the computer system according to claim 17, wherein the location information has information about a port of the second physical server and a LUN for relating the port to the migration target volume;
   wherein the domain information has the port information and the LUN; and
   wherein the management computer obtains identification information of the migration target volume by checking the port information and the LUN of the first configuration information against the port information and the LUN of the second configuration information.

* * * * *